US011044469B2

United States Patent
Kotra et al.

(10) Patent No.: US 11,044,469 B2
(45) Date of Patent: Jun. 22, 2021

(54) METHOD AND APPARATUS FOR INTRA PREDICTION

(71) Applicant: Huawei Technologies Co., Ltd., Shenzhen (CN)

(72) Inventors: Anand Meher Kotra, Munich (DE); Biao Wang, Munich (DE); Semih Esenlik, Munich (DE); Jianle Chen, Santa Clara, CA (US); Zhijie Zhao, Munich (DE); Han Gao, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/947,840

(22) Filed: Aug. 19, 2020

(65) Prior Publication Data
US 2020/0382768 A1 Dec. 3, 2020

Related U.S. Application Data

(63) Continuation of application No. PCT/CN2019/100815, filed on Aug. 15, 2019.
(Continued)

(51) Int. Cl.
*H04N 7/18* (2006.01)
*H04N 19/105* (2014.01)
(Continued)

(52) U.S. Cl.
CPC ......... *H04N 19/105* (2014.11); *H04N 19/159* (2014.11); *H04N 19/176* (2014.11); *H04N 19/1883* (2014.11)

(58) Field of Classification Search
CPC ............. H04N 19/105; H04N 19/1883; H04N 19/176; H04N 19/159
(Continued)

(56) References Cited

U.S. PATENT DOCUMENTS

2013/0089144 A1  4/2013  Lee
2013/0128964 A1*  5/2013  Chien .................... H04N 19/70
                                                            375/240.12
(Continued)

FOREIGN PATENT DOCUMENTS

CN         104883565 A      9/2015
WO      2017204427 A1     11/2017
WO    WO-2018142903 A1 *   8/2018  ........... H04N 19/176

OTHER PUBLICATIONS

Lee et al, Intra-mixture prediction mode and enhanced most probable mode estimation for intra coding in H.264/AVC (Year: 2009).*
(Continued)

*Primary Examiner* — Shan E Elahi
(74) *Attorney, Agent, or Firm* — Womble Bond Dickinson (US) LLP

(57) ABSTRACT

A method for constructing a most probable mode (MPM) list for prediction process corresponding to video block is provided. The method includes determining whether a left block of a current coding block is available, in response to determining that the left block of the current coding block is available, adding an intra prediction mode of the left block into an MPM list; determining whether an above block of the current coding block is available, in response to determining that the above block of the current coding block is available, adding an intra prediction mode of the above block into the MPM list; adding an offset to the prediction mode of the left block to obtain a new prediction mode; and adding the above-offset prediction mode into the MPM list when the above-offset prediction mode is not in the MPM list. The MPM list is used to improve coding efficiency.

20 Claims, 8 Drawing Sheets

Related U.S. Application Data

(60) Provisional application No. 62/723,299, filed on Aug. 27, 2018.

(51) Int. Cl.
  *H04N 19/159* (2014.01)
  *H04N 19/176* (2014.01)
  *H04N 19/169* (2014.01)

(58) Field of Classification Search
  USPC .................................................. 375/240.02
  See application file for complete search history.

(56) References Cited

U.S. PATENT DOCUMENTS

| | | | | |
|---|---|---|---|---|
| 2013/0272411 | A1* | 10/2013 | Tu ........................ | H04N 19/51 375/240.16 |
| 2014/0092978 | A1* | 4/2014 | Bugdayci ............... | H04N 19/30 375/240.16 |
| 2016/0044310 | A1 | 2/2016 | Park et al. | |
| 2016/0295237 | A1 | 10/2016 | Piao et al. | |
| 2018/0048889 | A1* | 2/2018 | Zhang .................... | H04N 19/96 |
| 2018/0098064 | A1* | 4/2018 | Seregin ................ | H04N 19/463 |
| 2018/0160113 | A1 | 6/2018 | Jeong et al. | |
| 2020/0236366 | A1* | 7/2020 | Xu ......................... | H04N 19/91 |

OTHER PUBLICATIONS

ITU-T H.265(Feb. 2018), Series H: Audiovisual and Multimedia Systems, Infrastructure of audiovisual services—Coding of moving video, Feb. 2018. total 692 pages.

Yi-Wen Chen et al,"Description of SDR, HDR and 360 video coding technology proposal by Qualcomm and Technicolor-ow and high complexity versions", Joint Video Exploration Team (JVET) of ITU-T Sg 16 WP 3 and ISO/IRC JTC 1/SC 291WG 11, Document: JVET-J0021, 10th Meeting:San Diego, US, Apr. 10-20, 2018, total 43 pages.

B. Wang et al,"CE3-related: A unified MPM list for intra mode coding", Joint Video Experts Team (JVET) of ITTU-T SG 16 WP 3 and ISO/IEC JTC 1/SC 291WG 11, Document: JVET-N0185-r1, 14th Meeting: Geneva, CH, 19 Mar. 27, 2019, total 3 pages.

Yue Yu et al,"Non-EE1: Priority List Based Intra Mode Coding with 5 MPM", Joint Video Exploration Team (JVET) of ITU-T SG 16 WP 3 and ISO/IEC JTC 1/SC 291WG 11, Document: JVET-H0051, 8th Meeting: Macao, CN, Oct. 18-25, 2017, total 5 pages.

\* cited by examiner

METHOD AND APPARATUS FOR INTRA PREDICTION

CROSS-REFERENCE TO RELATED APPLICATIONS

This application is a continuation of International Application No. PCT/CN2019/100815, filed on Aug. 15, 2019, which claims the priority to U.S. Provisional Patent Application No. 62/723,299, filed on Aug. 27, 2018, the disclosures of which are incorporated herein by reference in their entireties.

TECHNICAL FIELD

The present disclosure relates to the technical field of image and/or video coding and decoding, and in particular to method and apparatus for intra prediction.

BACKGROUND

Digital video has been widely used since the introduction of DVD-discs. Before transmission the video is encoded and transmitted using a transmission medium. The viewer receives the video and uses a viewing device to decode and display the video. Over the years the quality of video has improved, for example, because of higher resolutions, color depths and frame rates. This has lead into larger data streams that are nowadays commonly transported over internet and mobile communication networks.

Higher resolution videos, however, typically require more bandwidth as they have more information. In order to reduce bandwidth requirements video coding standards involving compression of the video have been introduced. When the video is encoded the bandwidth requirements (or corresponding memory requirements in case of storage) are reduced. Often this reduction comes at the cost of quality. Thus, the video coding standards try to find a balance between bandwidth requirements and quality.

The High Efficiency Video Coding (HEVC) is an example of a video coding standard that is commonly known to persons skilled in the art. In HEVC, to split a coding unit (CU) into prediction units (PU) or transform units (TUs). The Versatile Video Coding (VVC) next generation standard is the most recent joint video project of the ITU-T Video Coding Experts Group (VCEG) and the ISO/IEC Moving Picture Experts Group (MPEG) standardization organizations, working together in a partnership known as the Joint Video Exploration Team (WET). VVC is also referred to as ITU-T H.266/Next Generation Video Coding (NGVC) standard. In VVC, it removes the concepts of multiple partition types, i.e. it removes the separation of the CU, PU and TU concepts except as needed for CUs that have a size too large for the maximum transform length, and supports more flexibility for CU partition shapes.

Processing of these coding units (CUs) (also referred to as blocks) depend on their size, spatial position and a coding mode specified by an encoder. Coding modes can be classified into two groups according to the type of prediction: intra-prediction and inter-prediction modes. Intra prediction modes use samples of the same picture (also referred to as frame or image) to generate reference samples to calculate the prediction values for the samples of the block being reconstructed. Intra prediction is also referred to as spatial prediction. Inter-prediction modes are designed for temporal prediction and uses reference samples of previous or next pictures to predict samples of the block of the current picture.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (WET) to evaluate compression technology designs proposed by their experts in this area.

The VTM (Versatile Test Model) standard uses 35 Intra modes whereas the BMS (Benchmark Set) uses 67 Intra modes.

Intra mode coding scheme currently described in BMS is considered complex and a disadvantage of non-selected mode set is that the index list is always constant and not adaptive based on the current block properties (for e.g. its neighboring blocks INTRA modes).

SUMMARY

Apparatus and method for intra prediction are disclosed. The apparatus and method use an improved process to determine a list of most probable modes. The scope of protection is defined by the claims. Further implementation forms are apparent from the dependent claims, the description and the figures.

According to an aspect, a method for constructing a most probable mode, MPM, list for prediction process is described. The method comprises: determining whether a left block of a current block is available, in response to determining that the left block of the current block is available, adding an intra prediction mode of the left block into an MPM list; determining whether an above block of the current coding block is available, in response to determining that the above block of the current coding block is available, adding an intra prediction mode of the above block into the MPM list; adding an offset to the intra prediction mode of the left block to obtain a new prediction mode when the left block of the current coding block is available and the intra prediction mode of the left block is an angular mode; and adding the new prediction mode into the MPM list when the new prediction mode is not in the MPM list; and/or adding an offset to the intra prediction mode of the above block to obtain an above-offset prediction mode when the above block of the current coding block is available and the intra prediction mode of the above block is an angular mode; and adding the above-offset prediction mode into the MPM list when the above-offset prediction mode is not in the MPM list.

In an embodiment, the offset is −1 or +1.

In an embodiment, the method further comprises: when a planar mode is not in the MPM list, adding the planar mode into the MPM list; and when a DC mode is not in the MPM list, adding the DC mode into the MPM list.

In an embodiment, to determine whether the left block of the current block is available, when a prediction mode of the left block is not an intra prediction mode, it is determined that the left block of the current coding block is not available.

In an embodiment, to determine whether the left block of the current block is available, when the current coding block is a coding block located in the left-most side of a frame, it is determined that the left block of the current coding block is not available.

In an embodiment, to determine whether the left block of the current block is available, when parallel processing is supported and the current coding block is a coding block located in a left-most side of a slice or a tile, it is determined that the left block of the current coding block is not available.

In an embodiment, to determine whether the left block of the current block is available, when parallel processing is not supported and the current coding block is a coding block located in a left-most side of a slice or a tile but not in a left-most side of a frame, it is determined that the left block of the current coding block is available.

In an embodiment, to determine whether the above block of the current coding block is available, when a prediction mode of the above block is not an intra prediction mode, it is determined that the above block of the current coding block is not available.

In an embodiment, to determine whether the above block of the current coding block is available, when the current coding block is a coding block located in a top-most side of a frame, it is determined that the above block of the current coding block is not available.

In an embodiment, to determine whether the above block of the current coding block is available, when parallel processing is supported and the current coding block is a coding block located in a top-most side of a slice or a tile, it is determined that the above block of the current coding block is not available.

In an embodiment, to determine whether the above block of the current coding block is available, when parallel processing is not supported and the current coding block is a coding block located in a top-most side of a slice or a tile but not in a top-most side of a frame, it is determined that the above block of the current coding block is available.

In an embodiment, to determine whether the above block of the current coding block is available, when a line buffer size is constrained and the current coding block is a coding block located in a top-most side of a current coding tree unit, it is determined that the above block of the current coding block is not available.

According to an aspect, the present disclosure relates to an encoder comprising processing circuitry for carrying out any one of the above methods.

According to an aspect, the present disclosure relates to a decoder comprising processing circuitry for carrying out any one of the above methods.

According to an aspect, the present disclosure relates to a program product comprising a program code for performing any one of the above methods.

BRIEF DESCRIPTION OF THE DRAWINGS

The following embodiments are described in more detail with reference to the attached figures and drawings, in which.

Figure 1:
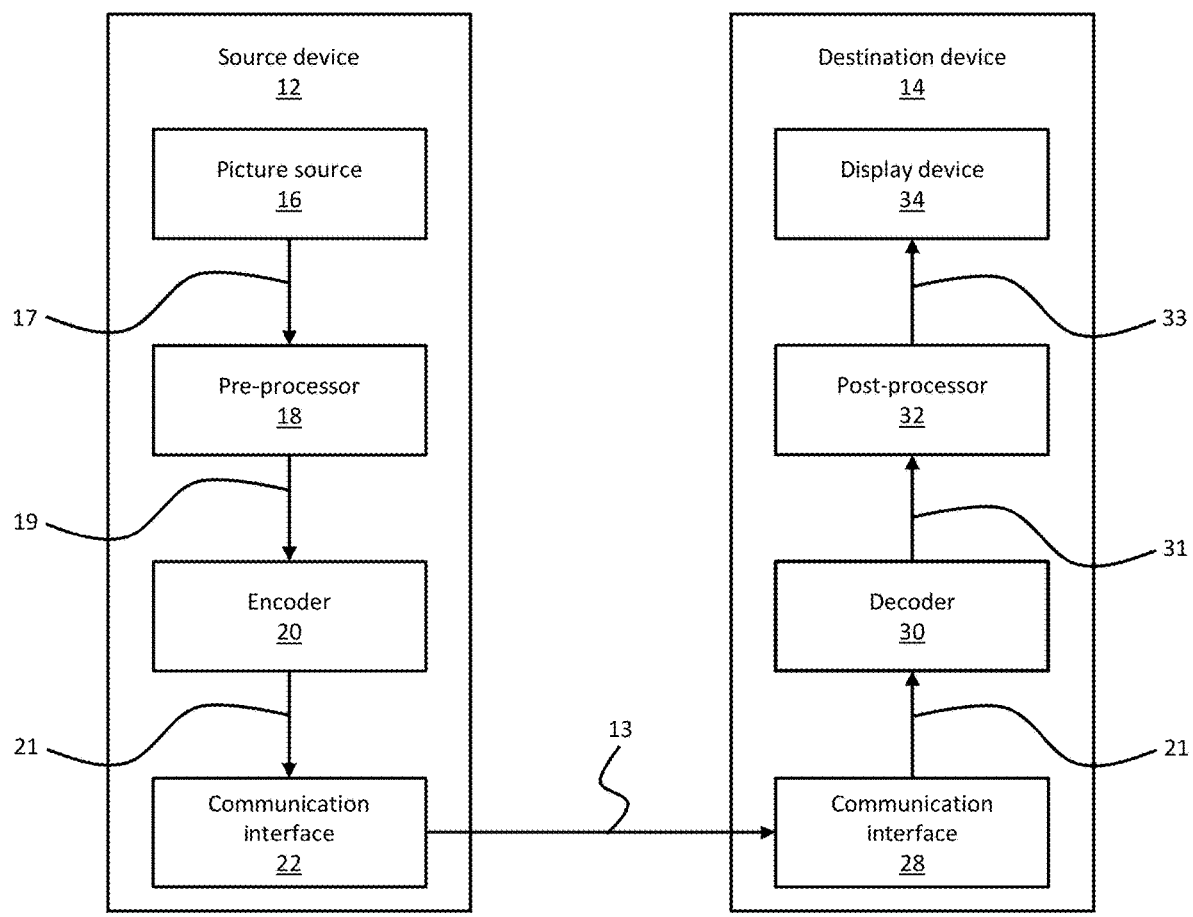
FIG. 1 is a block diagram showing an example of a video coding system according to one embodiment.

In the following identical reference signs refer to identical or at least functionally equivalent features if not explicitly specified otherwise.

DETAILED DESCRIPTION

In the following description, reference is made to the accompanying drawings, which form part of the disclosure, and in which are shown, by way of illustration, specific aspects in which the disclosure may be placed. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary aspects described herein may be combined with each other, unless specifically noted otherwise.

Video coding typically refers to the processing of a sequence of pictures, which form the video or video sequence. The term picture, image or frame may be used/are used synonymously in the field of video coding as well as in this application.

Video coding (or coding in general) comprises two parts: video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Each picture is typically partitioned into a set of non-overlapping blocks. The encoding/decoding of the picture is typically performed on a block level where e.g. inter frame prediction or intra frame prediction are used to generate a prediction block, to subtract the prediction block from the current block (e.g., block currently processed/to be processed) to obtain a residual block, which is further transformed and quantized to reduce the amount of data to be transmitted (compression) whereas at the decoder side the inverse processing is applied to the encoded/compressed block to reconstruct the block for representation.

FIG. 1 is a block diagram illustrating an example coding system, e.g., a video coding system that may utilize techniques disclosed herein. Encoder 20 (e.g., a video encoder) and decoder 30 (e.g., a video decoder) of the coding system represent examples of devices that may be configured to perform techniques in accordance with various examples described herein. As shown in FIG. 1, the coding system comprises a source device 12 configured to provide encoded data 13, for example an encoded picture, to a destination device 14 for decoding the encoded data 13.

The source device 12 comprises an encoder 20, and may additionally comprise a picture source 16, a pre-processor (or pre-processing unit) 18, e.g. a picture pre-processing unit, and a communication interface (or communication unit) 22.

The picture source 16 may comprise or be any kind of picture capturing device, for example for capturing a real-world picture, and/or any kind of a picture or comment (e.g., for screen content coding, some texts on the screen is also considered a part of a picture or image to be encoded) generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g., an augmented reality (AR) picture).

In some embodiments, a picture (or digital picture) is or can be regarded as a two-dimensional array or matrix of samples with intensity values. A sample in the array may also be referred to as pixel (also referred to as picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space, a picture comprises a corresponding red, green and blue sample array. However, in video coding each pixel is typically represented in a luminance/chrominance format or color space, e.g. YCbCr, which comprises a luminance component indicated by Y (sometimes also L is used instead) and two chrominance components indicated by Cb and Cr. The luminance (or luma) component Y represents the brightness or grey level intensity (e.g. like in a grey-scale picture), while the two chrominance (or chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 16 (e.g. video source) may be, for example, a camera for capturing a picture, a memory, e.g. a picture memory comprising or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 17 may be the same interface as or a part of the communication interface 22.

In distinction to the pre-processing unit 18 and the processing performed by the pre-processing unit 18, the picture or picture data 17 (e.g. video data) may also be referred to as raw picture or raw picture data.

Pre-processing unit 18 is configured to receive picture data 17 and to perform pre-processing on the picture data 17 to obtain a pre-processed picture (or pre-processed picture data) 19. Pre-processing performed by the pre-processing unit 18 may, e.g., comprise trimming, color format conversion (e.g. from RGB to YCbCr), color correction, or de-noising. It can be understood that the pre-processing unit 18 may be an optional component in some embodiments.

The encoder 20 (e.g. video encoder) is configured to receive the pre-processed picture data 19 and provide encoded picture data 21 (further details will be described below, e.g., based on FIG. 2).

Communication interface 22 of the source device 12 may be configured to receive the encoded picture data 21 and to transmit encoded picture data 21 to another device, e.g. the destination device 14 or any other device, for storage or direct reconstruction, or to process the encoded picture data 21 for respectively before storing the encoded data 13 and/or transmitting the encoded data 13 to another device, e.g. the destination device 14 or any other device for decoding or storing.

The destination device 14 comprises a decoder 30 (e.g. a video decoder), and may additionally comprise a communication interface or communication unit 28, a post-processor (or post-processing unit) 32 and a display device 34.

The communication interface 28 of the destination device 14 is configured receive the encoded picture data 21 or the encoded data 13, e.g. directly from the source device 12 or from any other source, e.g. a storage device, such as an encoded picture data storage device.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be configured to package the encoded picture data 21 into an appropriate format, e.g. packets, for transmission over a communication link or communication network.

The communication interface 28, forming the counterpart of the communication interface 22, may be configured to de-package the encoded data 13 to obtain the encoded picture data 21.

Both communication interface 22 and communication interface 28 may be configured as unidirectional communication interfaces as indicated by the arrow for the encoded picture data 13 in FIG. 1 pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data (or decoded picture) 31 (further details will be described below, e.g., based on FIG. 3).

The post-processor 32 of destination device 14 is configured to post-process the decoded picture data 31 (also called reconstructed picture data), e.g. a decoded picture, to obtain post-processed picture data 33, e.g. a post-processed picture. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1 depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for a skilled person based on the description, the existence and (exact) split of functionalities of the different units or functionalities within the source device 12 and/or destination device 14 as shown in FIG. 1 may vary depending on the actual device and application.

In some embodiments, each of encoder 20 (e.g. a video encoder) and decoder 30 (e.g. a video decoder) may be implemented as any one of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any one of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some embodiments, the coding system illustrated in FIG. 1 is merely an example and the techniques described herein may apply to video coding settings (e.g., video encoding or video decoding) that do not necessarily include any data communication between the encoding and decoding devices. In other embodiments, data may be retrieved from a local memory, streamed over a network, or the like. A video encoding device may encode and store data to memory, and/or a video decoding device may retrieve and decode data from memory. In some embodiments, the encoding and decoding is performed by devices that do not communicate with one another, but simply encode data to memory and/or retrieve and decode data from memory.

Figure 2:
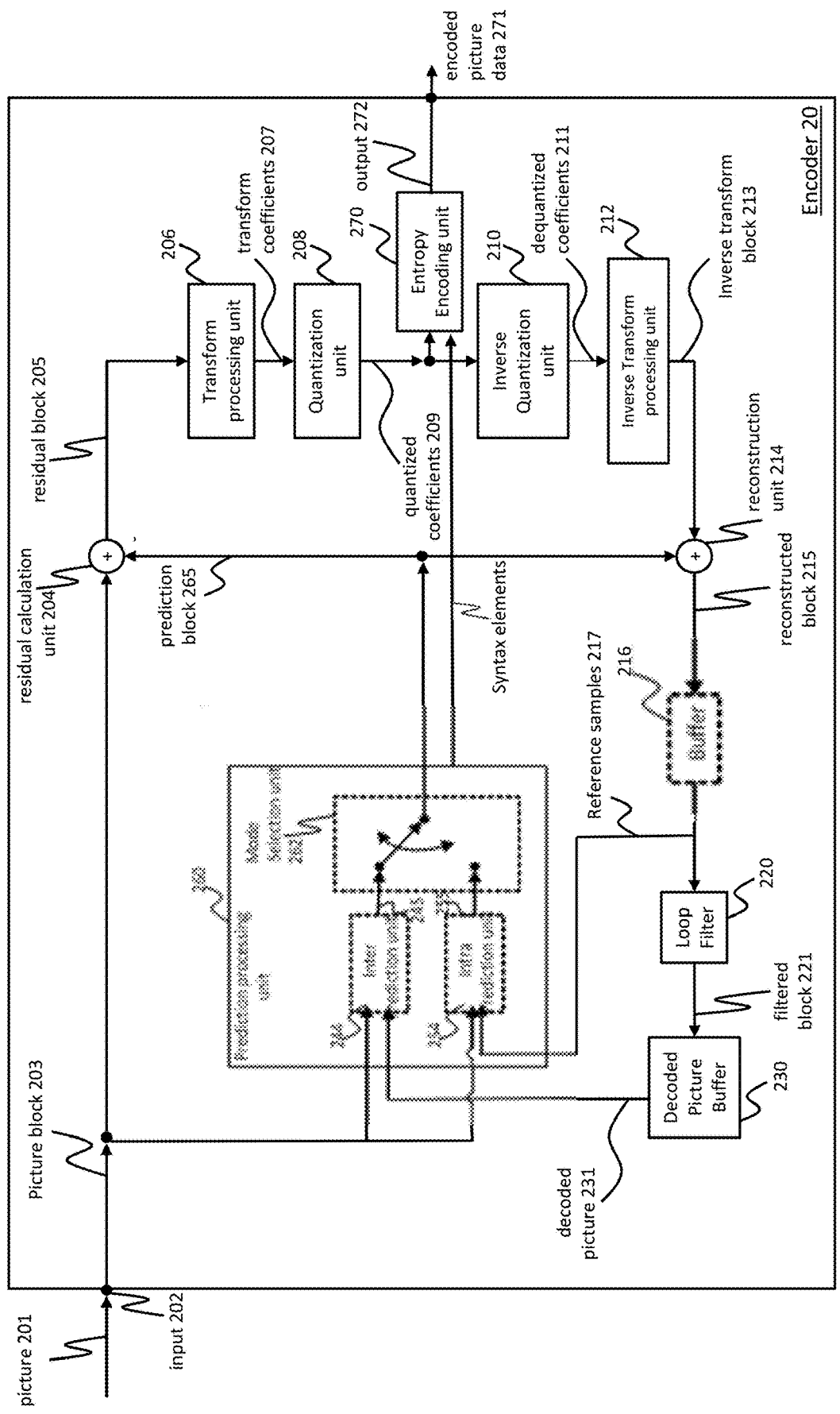
FIG. 2 is a block diagram showing an example of a video encoder according to one embodiment.

FIG. 2 is a block diagram of an example video encoder according to one embodiment. In the example of FIG. 2, encoder 20 (e.g., a video encoder) comprises a residual calculation unit 204, a transform processing unit 206, a quantization unit 208, an inverse quantization unit 210, and inverse transform processing unit 212, a reconstruction unit 214, a buffer 216, a loop filter unit 220, a decoded picture buffer (DPB) 230, a prediction processing unit 260 and an entropy encoding unit 270. The prediction processing unit 260 may include an inter prediction unit 244, an intra prediction unit 254 and a mode selection unit 262. Inter prediction unit 244 may include a motion estimation unit and a motion compensation unit (not shown). Encoder 20 may also be referred to as hybrid video encoder or a video encoder according to a hybrid video codec.

Figure 3:
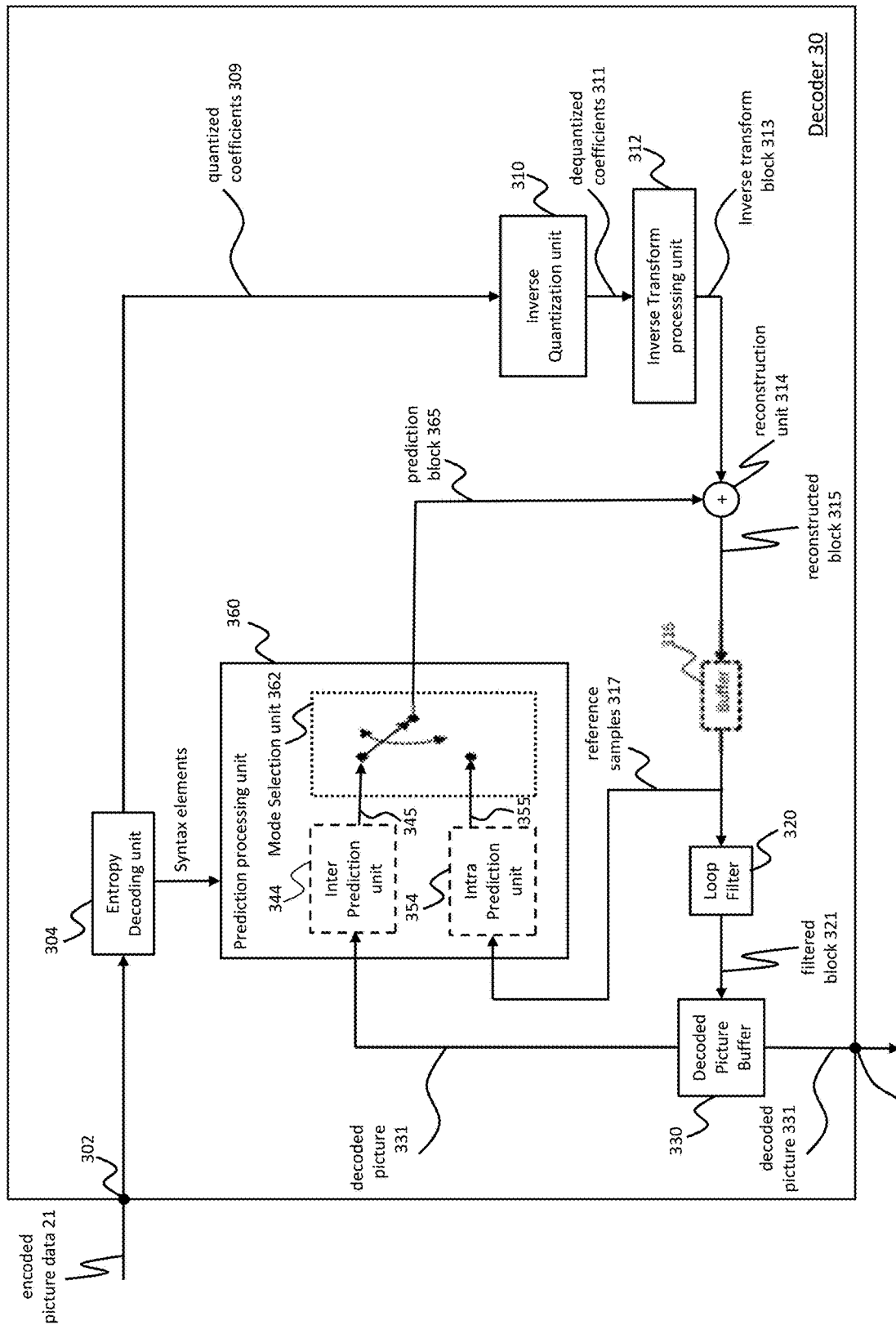
FIG. 3 is a block diagram showing an example structure of a video decoder according to one embodiment.

For example, the residual calculation unit 204, the transform processing unit 206, the quantization unit 208, the prediction processing unit 260 and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, prediction processing unit 260 form a backward signal path of the encoder, where the backward signal path of the encoder corresponds to the signal path of the decoder (see e.g., decoder 30 in FIG. 3). In one embodiment, residual block 205 may be transformed by transformation processing unit 206 (e.g., using discrete cosine transform (DCT)) to produce transform coefficients 207. Transform coefficients 207 may be quantized by quantization unit 208. The output of the quantization unit 208 (i.e., quantized coefficients 209) as well as syntax elements as provided, for instance, by the intra prediction unit 254 and/or the inter prediction unit 244 are further encoded by entropy encoding unit 270. Output 272 from entropy encoding unit 270 is encoded picture data 271.

In one embodiment, encoder 20 is configured to receive, e.g. by input 202, a picture 201 or a picture block 203 of the picture 201, e.g. picture of a sequence of pictures forming a video or video sequence. The picture block 203 may also be referred to as a current picture block or picture block to be coded, and the picture 201 as a current picture or picture to be coded (in particular in video coding to distinguish the current picture from other pictures, e.g. previously encoded and/or decoded pictures of the same video sequence, i.e. the video sequence which also comprises the current picture).

In one embodiment, prediction processing unit 260, also referred to as block prediction processing unit, is configured to receive or obtain picture block 203 (e.g., a current picture block) and reconstructed picture data, e.g. reference samples 217 of the same (or current) picture from buffer 216 and/or reference picture data (or decoded picture) 231 from one or a plurality of previously decoded pictures from decoded picture buffer 230, and to process such data for prediction, i.e. to provide a prediction block 265, which may be an inter-predicted block 245 or an intra-predicted block 255. In some embodiments, the reconstructed block 215 can be provided to buffer 216 and used as reference samples 217 for intra prediction, and filtered block/frame 221 can be provided to decoded picture buffer 230 by loop filter 220 for decoded picture output 231 and for inter prediction.

Mode selection unit 262 may be configured to select a prediction mode (e.g. an intra or inter prediction mode) and/or a corresponding prediction block 245 or 255 to be used as prediction block 265 for the calculation of the residual block 205 and for the reconstruction of the reconstructed block 215.

In some embodiments, mode selection unit 262 may be configured to select the prediction mode (e.g. from those supported by prediction processing unit 260), which provides the best match or in other words the minimum residual (minimum residual means better compression for transmission or storage), or a minimum signaling overhead (minimum signaling overhead means better compression for transmission or storage), or which considers or balances both. The mode selection unit 262 may be configured to determine the prediction mode based on rate distortion optimization (RDO), i.e. select the prediction mode which provides a minimum rate distortion optimization or which associated rate distortion at least a fulfills a prediction mode selection criterion.

The intra prediction unit 254 is further configured to determine based on intra prediction parameter, e.g. the selected intra prediction mode, the intra prediction block 255. In any case, after selecting an intra prediction mode for a block, the intra prediction unit 254 may also be configured to provide intra prediction parameter, i.e. information indicative of the selected intra prediction mode for the block to the entropy encoding unit 270. In one embodiment, the intra prediction unit 254 may be configured to perform any combination of the intra prediction techniques described herein below.

In some embodiments, encoder 20 may comprise a picture partitioning unit (not depicted in FIG. 2) configured to partition the picture into a plurality of picture blocks (e.g., non-overlapping picture blocks). These blocks may also be referred to as root blocks, macro blocks (H.264/AVC) or coding tree blocks (CTB) or coding tree units (CTU) (H.265/ HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

Like the picture, the picture block again is or can be regarded as a two-dimensional array or matrix of samples with intensity values (sample values), although of smaller dimension than the picture. In other words, the block may comprise, e.g., one sample array (e.g. a luma array in case of a monochrome picture, or a luma or chroma array in case of a color picture) or three sample arrays (e.g. a luma and two chroma arrays in case of a color picture) or any other number and/or kind of arrays depending on the color format applied. The number of samples in horizontal and vertical direction (or axis) of the block define the size of block. Accordingly, a block may, for example, an M×N (M-column by N-row) array of samples, or an M×N array of transform coefficients.

In some embodiments, encoder 20 may be configured to encode the picture block by block, e.g. the encoding and prediction is performed per block.

In some embodiments, encoder 20 may be further configured to partition and/or encode the picture by using slices (also referred to as video slices), where a picture may be partitioned into or encoded using one or more slices (e.g., non-overlapping slices), and each slice may comprise one or more blocks (e.g. CTUs).

In some embodiments, encoder 20 may be further configured to partition and/or encode the picture by using tile groups (also referred to as video tile groups) and/or tiles (also referred to as video tiles), where a picture may be partitioned into or encoded using one or more tile groups (e.g., non-overlapping tile groups), and each tile group may comprise, e.g. one or more blocks (e.g. CTUs) or one or more tiles, where each tile, e.g. may be of rectangular shape and may comprise one or more blocks (e.g. CTUs), e.g. complete or fractional blocks.

FIG. 3 is a block diagram of an exemplary video decoder according to one embodiment. Decoder 30 (e.g., a video decoder) is configured to receive encoded picture data 21 (e.g. encoded bitstream), e.g. encoded by encoder 20, to obtain a decoded picture 331. During the decoding process, decoder 30 receives video data, e.g. an encoded video bitstream that represents picture blocks of an encoded video slice and associated syntax elements, from encoder 20.

In the example of FIG. 3, the decoder 30 comprises an entropy decoding unit 304, an inverse quantization unit 310, an inverse transform processing unit 312, a reconstruction unit 314 (e.g. a summer), a buffer 316, a loop filter 320, a decoded picture buffer 330 and a prediction processing unit 360. The prediction processing unit 360 may include an inter prediction unit 344, an intra prediction unit 354, and a mode selection unit 362. Video decoder 30 may, in some embodiments, perform a decoding pass generally reciprocal to the encoding pass described with respect to encoder 20 from FIG. 2.

In one embodiment, entropy decoding unit 304 is configured to perform entropy decoding to encoded picture data 21 to obtain, e.g., quantized coefficients 309 and/or decoded coding parameters (not shown in FIG. 3), e.g. any or all of inter prediction parameters, intra prediction parameter, loop filter parameters, and/or other syntax elements. Entropy decoding unit 304 is further configured to forward inter prediction parameters, intra prediction parameter and/or other syntax elements to the prediction processing unit 360. In one embodiment, decoder 30 may receive the syntax elements at the video slice level and/or the video block level.

The inverse quantization unit 310 may be identical in function to the inverse quantization unit 210, the inverse transform processing unit 312 may be identical in function to the inverse transform processing unit 212, the reconstruction unit 314 may be identical in function reconstruction unit 214, the buffer 316 may be identical in function to the buffer 216, the loop filter 320 may be identical in function to the loop filter 220, and the decoded picture buffer 330 may be identical in function to the decoded picture buffer 230.

The prediction processing unit 360 may comprise an inter prediction unit 344 and an intra prediction unit 354, where the inter prediction unit 344 may resemble the inter prediction unit 244 in function, and the intra prediction unit 354 may resemble the intra prediction unit 254 in function. The prediction processing unit 360 may be configured to perform the block prediction and/or obtain the prediction block 365 from the encoded picture data 21 and to receive or obtain (explicitly or implicitly) the prediction related parameters and/or the information about the selected prediction mode, e.g. from the entropy decoding unit 304.

In one embodiment, when the video slice is coded as an intra coded (I) slice, intra prediction unit 354 is configured to generate prediction block 365 for a picture block of the current video slice based on a signaled intra prediction mode and data from previously decoded blocks of the current frame or picture. In one embodiment, when the video frame is coded as an inter coded (i.e., B, or P) slice, inter prediction unit 344 (e.g. motion compensation unit) is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Decoder 30 may construct the reference frame lists, e.g., List 0 and List 1, using default construction techniques based on reference pictures stored in DPB 330.

In one embodiment prediction processing unit 360 is configured to determine prediction information for a video block of the current video slice by parsing the motion vectors and other syntax elements, and uses the prediction information to produce the prediction blocks for the current video block being decoded. For example, the prediction processing unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Inverse quantization unit 310 is configured to inverse quantize, i.e., de-quantize, the quantized transform coefficients 309 provided in the bitstream and decoded by entropy decoding unit 304 and produce dequantized coefficients 311. The inverse quantization process may include use of a quantization parameter calculated by encoder 20 for each video block in the video slice to determine a degree of quantization and, likewise, a degree of inverse quantization that should be applied.

Inverse transform processing unit 312 is configured to apply an inverse transform, e.g., an inverse DCT, an inverse integer transform, or a conceptually similar inverse transform process, on dequantized coefficients 311 to the transform coefficients 311 in order to produce inverse transform block 313 (e.g., residual blocks) in the pixel domain.

The reconstruction unit 314 (e.g. a summer) is configured to add the inverse transform block 313 (e.g., reconstructed residual block) to the prediction block 365 to obtain a reconstructed block 315 in the sample domain, e.g. by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g. to smooth pixel transitions, or otherwise improve the video quality. In one example, the loop filter unit 320 may be configured to perform any combination of the filtering techniques described herein below. The loop filter unit 320 may represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 320 is shown in FIG. 3 as being an in loop filter, in other embodiments, the loop filter unit 320 may be implemented as a post loop filter.

The filtered block 321 (i.e., decoded video block) in a given frame or picture are then stored in decoded picture buffer 330, which stores reference pictures used for subsequent motion compensation.

The decoder 30 is configured to output the decoded picture 331, e.g. via output 332, for presentation or viewing to a user.

Other variations of the video decoder 30 can be used to decode the compressed bitstream. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

In some embodiments, decoder 30 may be configured to partition and/or decode the picture by using slices (also referred to as video slices), where a picture may be partitioned into or decoded using one or more slices (e.g., non-overlapping slices), and each slice may comprise one or more blocks (e.g. CTUs).

In some embodiments, decoder 30 may be configured to partition and/or decode the picture by using tile groups (also referred to as video tile groups) and/or tiles (also referred to as video tiles), where a picture may be partitioned into or decoded using one or more tile groups (e.g., non-overlapping tile groups), and each tile group may comprise, e.g. one or more blocks (e.g. CTUs) or one or more tiles, where each tile, e.g. may be of rectangular shape and may comprise one or more blocks (e.g. CTUs), e.g. complete or fractional blocks.

It should be understood that, in the encoder and the decoder, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

Figure 4:
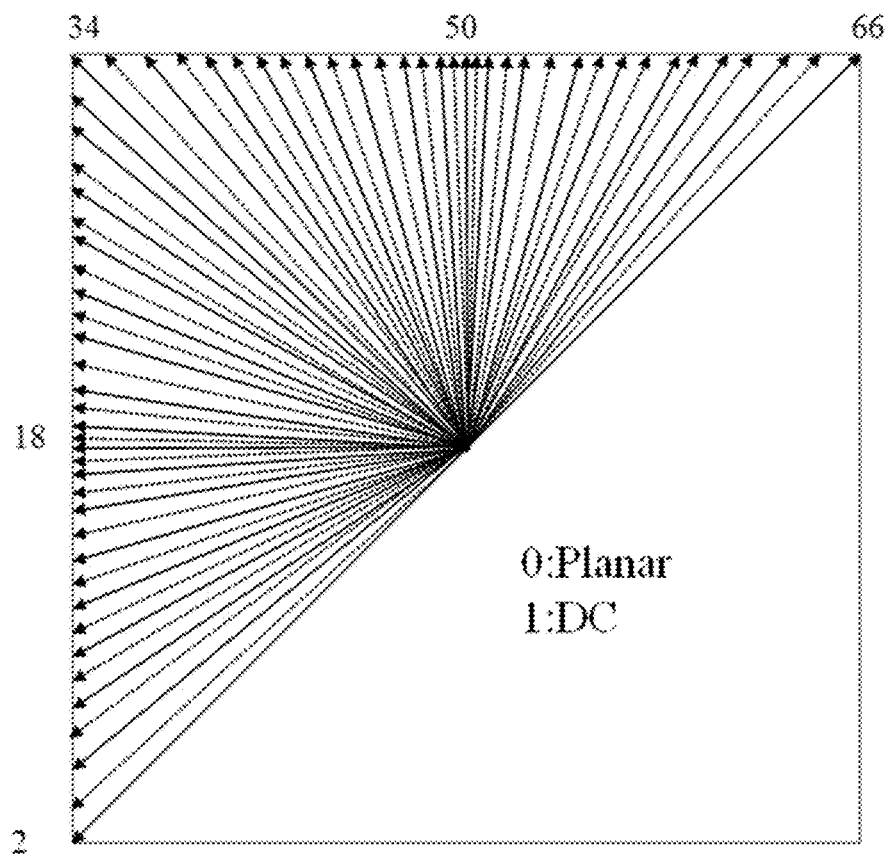
FIG. 4 is a diagram illustrating 67 intra prediction modes.

According to the HEVC/H.265 standard, 35 intra prediction modes are available. As shown in FIG. 4, this set contains the following modes: planar mode (the intra prediction mode index is 0), DC mode (the intra prediction mode index is 1), and directional (angular) modes that cover the 180° range and have the intra prediction mode index value range of 2 to 34 shown by black arrows in FIG. 4. To capture the arbitrary edge directions present in natural video, the number of directional intra modes is extended from 33, as used in HEVC, to 65. The additional directional modes are depicted as dotted arrows in FIG. 4, and the planar and DC modes remain the same. It is worth noting that the range that is covered by intra prediction modes can be wider than 180°. In particular, 62 directional modes with index values of 3 to 64 cover the range of approximately 230°, i.e. several pairs of modes have opposite directionality. In the case of the HEVC Reference Model (HM) and JEM platforms, only one pair of angular modes (namely, modes 2 and 66) has opposite directionality as shown in FIG. 4. For constructing a predictor, conventional angular modes take reference samples and (if needed) filter them to get a sample predictor. The number of reference samples required for constructing a predictor depends on the length of the filter used for interpolation (e.g., bilinear and cubic filters have lengths of 2 and 4, respectively).

Video coding schemes such as H.264/AVC and HEVC are designed along the successful principle of block-based hybrid video coding. Using this principle, a picture is first partitioned into blocks and then each block is predicted by using intra-picture or inter-picture prediction.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (or picture block) level, e.g. by using spatial (or intra picture) prediction and temporal (or inter picture) prediction to generate a prediction block, subtracting the prediction block from the current block (e.g., block currently processed/to be processed) to obtain a residual block, transforming the residual block and quantizing the residual block in the transform domain to reduce the amount of data to be transmitted (i.e., compression), whereas at the decoder the inverse processing compared to the encoder is partially applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

As used herein, the term "block" may refer to a portion of a picture or a frame. For convenience of description, embodiments of the disclosure are described herein in reference to High-Efficiency Video Coding (HEVC) or the reference software of Versatile video coding (VVC), developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC. It may refer to a CU, PU, and TU. In HEVC, a CTU is split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. In the newest development of the video compression technical, Quad-tree and binary tree (QTBT) partitioning frame is used to partition a coding block. In the QTBT block structure, a CU can have either a square or a rectangular shape. For example, a coding tree unit (CTU) is first partitioned by a quadtree structure. The quadtree leaf nodes are further partitioned by a binary tree structure. The binary tree leaf nodes are called coding units (CUs), and that segmentation is used for prediction and transform processing without any further partitioning. This means that the CU, PU and TU have the same block size in the QTBT coding block structure. In parallel, multiply partition, for example, triple tree partition was also proposed to be used together with the QTBT block structure.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (WET) to evaluate compression technology designs proposed by their experts in this area.

The VTM (Versatile Test Model) uses 35 Intra modes whereas the BMS (Benchmark Set) uses 67 Intra modes. To code the 67 intra modes, the current intra mode coding scheme in BMS uses the following method:

To accommodate the increased number of directional Intra modes in BMS, an Intra mode coding method with 6 Most Probable Modes (MPMs) is used. Two major technical aspects are involved:

1) the derivation of 6 MPMs, and
2) entropy coding of 6 MPMs and non-MPM modes.

In BMS, the modes included into the MPM lists are classified into three groups: Neighbor intra modes, Derived intra modes, and Default intra modes.

Figure 5:
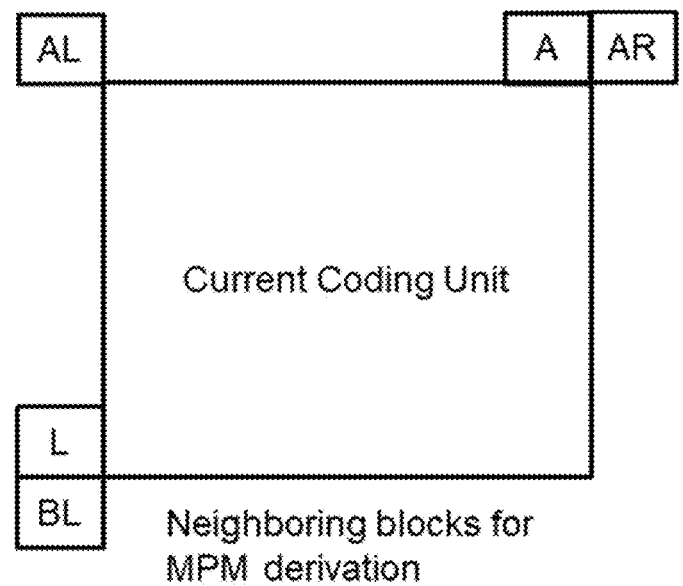
FIG. 5 is a diagram illustrating neighboring blocks for MPM derivation.

Five neighboring intra prediction modes are used to form the MPM list. Those locations of the 5 neighboring blocks are the same as those used in the merge mode, i.e., left (L), above (A), below left (BL), above right (AR), and above left (AL) as shown in FIG. 5. An initial MPM list is formed by inserting 5 neighbor intra modes, planar, and DC modes into the MPM list. A pruning process is used to remove the duplicated modes so that only unique modes are included into the MPM list. The order in which the initial modes are included is left, above, planar, DC, below left, above right, and above left.

If the MPM list is not full (i.e. has less than 6 MPMs candidates in the list), derived modes are added, those intra modes are obtained by adding −1 or +1 to the angular modes which are already included in the MPM list. Derivation is not applied to non-angular modes, i.e. DC or planar.

Finally, if the MPM list is still not complete, the default modes are added in the order of: vertical, horizontal, intra mode 2, and diagonal mode. As a result of this process, a unique list of 6 MPM modes is generated.

For entropy coding of 6 MPMs, a truncated unary binarization of the MPMs is used. The first three bins are coded with contexts, which depend on the MPM mode related to the bin currently being signaled. The MPM mode is classified into one of three categories: (a) whether the mode belongs to horizontal (e.g., MPM mode is less than or equal to a diagonal direction), (b) vertical (e.g., MPM mode greater than the diagonal direction), or (c) non-angular (e.g., DC and planar) class. Accordingly, three contexts are used to signal the MPM index.

The coding of the remaining 61 non-MPMs is done as follows. The 61 non-MPMs may initially be divided into two sets: selected modes set and non-selected modes set. The selected modes set contains 16 modes and the rest (45 modes) are assigned to the non-selected modes set. The mode set that the current mode belongs to is indicated in the bitstream with a flag. Then, the mode from the selected set is signaled with a 4-bit fixed-length code, and the mode from the non-selected set is coded with a truncated binary code. The selected modes set is generated by sub-sampling the total 61 non-MPM modes with indexes as follows:

Selected modes set={0, 4, 8, 12, 16, 20 . . . 60}
Non-selected modes set={1, 2, 3, 5, 6, 7, 9, 10 . . . 59}

The summary of the different INTRA mode signaling mechanisms is shown in Table 1.

TABLE 1

Current LUMA Intra mode signaling in BMS

| Intra prediction modes | MPM flag | Selected flag | Bin string |
| --- | --- | --- | --- |
| MPM modes (6) | 1 | | 0 |
| | | | 10 |
| | | | 110 |
| | | | 1110 |
| | | | 11110 |
| | | | 11111 |
| Selected modes (16) | 0 | 1 | 4 bits fixed length code |
| Non-selected modes (45) | 0 | 0 | Truncated binary code |

In another embodiment, an Intra mode coding method with 3 Most Probable Modes (MPMs) is used. In one embodiment, syntax elements intra_luma_mpm_flag[x0][y0], intra_luma_mpm idx[x0][y0] and intra_luma_mpm_remainder[x0][y0] specify the intra prediction mode for luma samples. The array indices x0, y0 specify the location (x0, y0) of the top-left luma sample of the considered prediction block relative to the top-left luma sample of the picture. When intra_luma_mpm_flag[x0][y0] is equal to 1, the intra prediction mode is inferred from a neighbouring intra-predicted prediction unit.

The Intra prediction for current block (IntraPredModeY [xPb][yPb]) is derived by the following ordered steps:

The neighbouring locations (xNbA, yNbA) and (xNbB, yNbB) are set equal to (xPb−1, yPb) and (xPb, yPb−1), respectively.
For X being replaced by either A or B, the variables candIntraPredModeX are derived as follows:
The availability derivation process for a block is invoked with the location (xCurr, yCurr) set equal to (xPb, yPb) and the neighbouring location (xNbY, yNbY) set equal to (xNbX, yNbX) as inputs, and the output is assigned to availableX.
The candidate intra prediction mode candIntraPredModeX is derived as follows:
If one or more of the following conditions are true, candIntraPredModeX is set equal to INTRA_DC:
The variable availableX is equal to FALSE.
CuPredMode[xNbX][yNbX] is not equal to MODE_INTRA.
X is equal to B and yPb−1 is less than ((yPb>>CtbLog2SizeY)<<CtbLog2SizeY).

Otherwise, candIntraPredModeX is set equal to IntraPredModeY[xNbX][yNbX].
The candModeList[x] with x=0 . . . 2 is derived as follows:
If candIntraPredModeB is equal to candIntraPredModeA, the following applies:
If candIntraPredModeA is less than 2 (i.e., equal to INTRA_PLANAR or INTRA_DC), candModeList[x] with x=0 . . . 2 is derived as follows:
candModeList[0]=INTRA_PLANAR
candModeList[1]=INTRA_DC
candModeList[2]=INTRA_ANGULAR50
Otherwise, candModeList[x] with x=0 . . . 2 is derived as follows:
candModeList[0]=candIntraPredModeA
candModeList[1]=2+((candIntraPredModeA+61) % 64)
candModeList[2]=2+((candIntraPredModeA−1) % 64)
Otherwise (candIntraPredModeB is not equal to candIntraPredModeA), the following applies:
candModeList[0] and candModeList[1] are derived as follows:
candModeList[0]=candIntraPredModeA
candModeList[1]=candIntraPredModeB
If neither of candModeList[0] and candModeList[1] is equal to INTRA_PLANAR, candModeList[2] is set equal to INTRA_PLANAR,
Otherwise, if neither of candModeList[0] and candModeList[1] is equal to INTRA_DC, candModeList[2] is set equal to INTRA_DC,
Otherwise, candModeList[2] is set equal to INTRA_ANGULAR50.
IntraPredModeY[xPb][yPb] is derived by applying the following procedure:
If intra_luma_mpm_flag[xPb][yPb] is equal to 1, the IntraPredModeY[xPb][yPb] is set equal to candModeList [intra_luma_mpm idx[xPb][yPb]].
Otherwise, IntraPredModeY[xPb][yPb] is derived by applying the following ordered steps:
The array candModeList[x], x=0 . . . 2 is modified by the following ordered steps:
When candModeList[0] is greater than candModeList[1], both values are swapped as follows:
(candModeList[0], candModeList[1])=Swap(candModeList[0], candModeList[1])
When candModeList[0] is greater than candModeList[2], both values are swapped as follows:
(candModeList[0], candModeList[2])=Swap(candModeList[0], candModeList[2])
When candModeList[1] is greater than candModeList[2], both values are swapped as follows:
(candModeList[1], candModeList[2])=Swap(candModeList[1], candModeList[2]) (8-11)
IntraPredModeY[xPb][yPb] is derived by the following ordered steps:
IntraPredModeY[xPb][yPb] is set equal to intra_luma_mpm_remainder[xPb][yPb].
For i equal to 0 to 2, inclusive, when IntraPredModeY [xPb][yPb] is greater than or equal to candModeList[i], the value of IntraPredModeY[xPb][yPb] is incremented by one.

In one aspect, a simplified method to construct the 6-entry MPM list is provided.

According to an embodiment, in a first step, it is determined whether a left block of a current coding block is available or not. If the left block of the current coding block is available, the intra prediction mode of the left block is added to the list of MPMs. The determination of whether or not a certain block is available will be described in detail further below.

In a second step, it is determined whether an above block of the current coding block is available. If the above block is determined to be available, the intra prediction mode of the above block is added to the list of MPMs.

As illustrated in FIG. 5, the left block L of the current coding block (or current coding unit) is a neighboring block of the current block. For instance, it is located adjacent to the current block on a lower left side of the current block. Further, the above block A of the current coding block (or current coding unit) is a neighboring block of the current block. For instance, it is located adjacent to the current block on a right top side of the current block.

In a third step, an offset is added to the intra prediction mode of the left block and/or the intra prediction mode of the above block, provided that the left block and/or the above block is available and its mode is an intra prediction angular mode. The new prediction mode determined by adding the offset to the prediction mode of the left and/or above block is added to the list of MPMs.

Note that a single new prediction mode may be determined by adding an offset to the prediction mode of the left block, a single new prediction mode may be determined by adding an offset to the prediction mode of the above block, or new prediction modes may be determined by adding an offset to the prediction mode of the left block and by adding an offset to the prediction modes of the above block.

Further, note that the offset added to the prediction mode of the left block may be different or equal to the offset added to the prediction mode of the above block.

Further, the offset added to the prediction mode of the left block and/or the offset added to the prediction mode of the above block may be a positive or a negative integer. In particular, the offset may be −1 or +1. However, the offset is not limited to +1 or −1 and may be any positive or negative integer.

In a case where the angular prediction modes are represented by a limited number of integers, adding the offset to the prediction mode may be performed in cyclic manner, as described in detail further below in the framework of another embodiment.

According to the embodiments of the present disclosure, above-described first and second steps are not limited to being performed in the described order, and the second step may be performed before the first step.

Further, in a case where the left block and the above block is available, embodiments of the present disclosure are not limited to adding an offset to the prediction mode of the left block and adding the resulting new prediction mode to the set of MPMs before adding an offset to the prediction mode of the above block and adding the resulting new prediction mode to the set of MPMs. Adding the offset to the prediction mode of the above block may be done before adding an offset to the prediction mode of the left block.

In a variation, a first offset may be added to the prediction mode of the left block and the new prediction block is added to the list of MPMs. Further, a second offset different from the first offset may be added to the prediction mode of the left block and the (second) new prediction block is added to the list of MPMs.

Similarly, a first offset may be added to the prediction mode of the above block and the new prediction block is added to the list of MPMs. Further, a second offset different from the first offset may be added to the prediction mode of the above block and the (second) new prediction block is added to the list of MPMs.

Note that the list of MPMs is not limited to including three or four modes and other modes may be added.

For example, a third offset may be added to the prediction mode of the above block and the new prediction mode is added to the list of MPMs. Further, a fourth offset different from the first offset may be added to the prediction mode of the above block and the (second) new prediction mode is added to the list of MPMs.

In another embodiment, one or more offsets may be added to the intra prediction mode of the left block and/or the intra prediction mode of the above block, provided that the left block and/or the above block is available and its mode is an intra prediction angular mode. The new one or more prediction modes determined by adding the one or more offsets to the prediction mode of the left and/or above block are added to the list of MPMs.

In a further embodiment, the method comprises: (a) check the availability of current coding units' left block. The position of the left block is illustrated by FIG. 5, where the left block is labeled by "L".

The left block is not available if no intra prediction information (i.e. intra prediction mode) can be derived from the left block. It includes the following cases:
  The left block is not an intra-predicted block. For instance, the prediction mode of the left block may be an inter prediction mode.
  The left block does not exist, for example, the current block is a coding block located in the left-most side of a frame.
  If the encoder or the decoder supports parallel processing, the left block might be considered as not existing if it is located in a different Tile than the current block, i.e. the current coding block is located in the left-most side of a Tile.
  In another embodiment, if parallel processing is not supported in the encoder or decoder, the left block might be considered as available if it is located in a different Tile than the current block, i.e. the current coding block is located in the left-most side of a Tile.
  If parallel processing is supported in the encoder or decoder, the left block might be considered as not existing if it is located in a different Slice than the current block, i.e. the current coding block is located in the left-most side of a slice.
  In another embodiment, if parallel processing is not supported in the encoder or decoder, the left block might be considered as available if it is located in a different Slice than the current block, i.e. the current coding block is located in the left-most side of a slice.

Otherwise (i.e., the left block is available), (b) include the intra prediction mode of the left block in the 6-entry MPM list. Note that even though the list of MPMs may include six entries according to the embodiment, the present disclosure is not limited thereto, and the list of MPMs may be a list of any length.

(c) Check the availability of current coding unit's above block. The position of the above block is illustrated by FIG. 5, where the above block is labeled by "A".

The above block is not available if no intra prediction information (i.e. intra prediction mode) can be derived from the above block. It includes the following cases:
  The above block is not an intra-predicted block. For instance, the prediction mode of the left block may be an inter prediction mode.

The above block does not exist. For example, the current block is a coding block located in the top-most side of a frame.

If parallel processing is supported in the encoder or decoder, the top (i.e. above) block might be considered as not existing if it is located in a different Tile than the current block, i.e. the current coding block is located in the top-most side of a Tile.

In another example, if parallel processing is not supported in the encoder or decoder, the top (i.e. above) block might be considered as available if it is located in a different Tile than the current block, i.e. the current coding block is located in the top-most side of a Tile;

If parallel processing is supported in the encoder or decoder, the top (i.e. above) block might be considered as not existing if it is located in a different Slice than the current block, i.e. the current coding block is located in the top-most side of a slice, In another example, if parallel processing is not supported in the encoder or decoder, the top (i.e. above) block might be considered as available if it is located in a different Slice than the current block, i.e. the current coding block is located in the top-most side of a slice;

If it is needed to constrain line buffer size in the encoder or decoder, the top (i.e. above) block might be considered as not existing if it is located in a different CTU than the current block, i.e. the current coding block is located in the top-most side of the current CTU.

In an example, if decoder side or encoder side supports line buffer restriction, then an above block located on a different CTU than the current block CTU is considered as not existing. If not support line buffer restriction, then consider it exists.

Otherwise (i.e., above block is available), (d) include the intra prediction mode of the top (i.e. above) block in the 6-entry MPM list.

(e) Check whether planar (PLANAR IDX=0) mode has been inserted in the MPM list, (i.e. check either intra mode of the left or the top (i.e. above) block is planar mode), only if planar mode has not been inserted in the MPM list, then insert the planar mode into the MPM list.

(f) Check whether DC (DC IDX=1) mode has been inserted in the MPM list, (i.e., check either intra modes of the left or the top (i.e. above) block is DC mode), only if DC mode has not been inserted in the MPM list, then insert the DC mode into the MPM list.

(g) If the left block is available and if its intra prediction mode is an angular mode, i.e. (mode>DC_IDX, and say its mode is angularLeft), get its nearest two angular modes by performing angularLeft-1, angularLeft+1. Note that when performing −1 or +1, it might involve a wrap up and wrap down operation. For example, if angularLeft is 2, then angularLeft-1 would be 66 (wrap up case), or if angularLeft is 66, then angularLeft+1 would be 2 (wrap down case).

In another example, if angularLeft is 2, then angularLeft-1 would be 65 (wrap up case), or if angularLeft is 66, then angulaLeft+1 would be 3. This wrap up may be chosen as modes 2 and 66 indicate (anti)parallel directions. In this case, the nearest two angular modes of angularLeft may be calculated as angularLeft-1=2+((angularLeft+61) % 64); and angularLeft+1=2+((angularLeft−1)% 64).

These calculation rules correspond to adding an offset of −1 or +1, respectively, with wrap-up and modes 0 and 1 not being angular prediction modes. The operator % depicts the modulo operation.

(h) If the prediction mode of angularLeft-1 has not been inserted into the MPM list, insert it (angularLeft-1) into the MPM list.

(i) If the prediction mode of angularLeft+1 has not been inserted into the MPM list, inserted it (angularLeft-1) into the MPM list.

(j) If MPM list is not full, if the above block is available and if its (above block's) intra prediction mode is an angular mode, i.e. (mode>DC_IDX, and say mode is angularAbove), get its nearest two angular modes by performing angularAbove-1, angularAbove+1. Note that when performing −1 or +1 it might involve a wrap up and wrap down operation.

In an example, if angularAbove is 2, then angularAbove-1 would be 66 (wrap up case), or if angularAbove is 66, then angularAbove+1 would be 2 (wrap down case).

In another example, if angularAbove is 2, then angularAbove-1 would be 65 (wrap up case), or if angularAbove is 66, then angulaAbove+1 would be 3. This wrap up may be chosen as modes 2 and 66 indicate (anti)parallel directions. In this case, the nearest two angular modes of angularAbove may be calculated as angularAbove-1=2+((angularAbove+61)% 64); and angularAbove+1=2+((angularAbove−1)% 64).

These calculation rules correspond to adding an offset of −1 or +1, respectively, with wrap-up and modes 0 and 1 not being angular prediction modes. The operator % depicts the modulo operation.

(k) If the prediction mode of angularAbove-1 has not been inserted into the MPM list, inserted it (angularAbove-1) into the MPM list.

(l) If MPM list is not full (for example, a quantity of prediction modes in the MPM list is less than 6) and if the prediction mode of angularAbove+1 has not been inserted into the MPM list, inserted it (angularAbove+1) into the MPM list.

(m) If the MPM list is not full, insert the following modes to MPM list until it is full (for example, a quantity of prediction modes in the MPM list is equal to 6):
a vertical mode (VER_IDX),
a horizontal mode (HOR_IDX),
an intra mode 2 (2),
a vertical diagonal mode (VDIA_IDX) or a diagonal mode (DIA_IDX);

Note that the determination of nearest neighbor modes described in detail in the framework of this embodiment may be also applied to other embodiments.

In the described embodiments, the list of MPMs is a list of finite length. For instance, the length of the list (i.e., the number of entries) may be predetermined. For instance, the number of entries of the MPM list may be six. However, the MPM list is not limited to six entries and may include another number of entries.

In the following, a summary of variations of the provided method are described:

The availability of the left block shall consider both to support or not to support parallel processing.

The availability of the above block shall consider both to support or not to support parallel processing.

The order to derive the two nearest mode of the left and above block can also be +1 first and then −1. That is, the nearest modes of the left and above blocks may be determined first by adding 1 to the respective mode index and then by subtracting 1 from the respective mode index.

Figure 6:
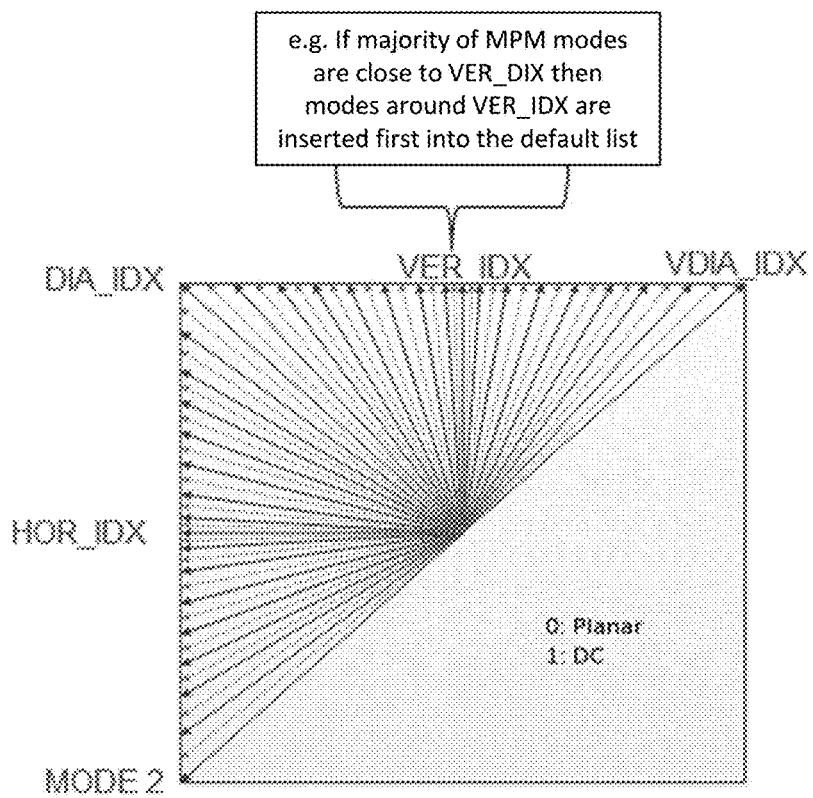
FIG. 6 is a diagram illustrating an example of first three modes in remaining mode list generation process.

The last candidate of MPM list can either be VIDA_IDX or DIA_IDX, as illustrated in FIG. 6, for example.

The order of insertion can also be Left, above, Planar, DC, and default modes (VER_IDX, HOR_IDX, 2, VDIA_IDX or DIA_IDX).

For the signaling of mpm_idx, truncated unary binarization is used. The first three bins of the mpm_idx are allowed to use three different independent contexts or all the bins of the mpm_idx are CABAC by pass coded.

In one aspect, a method for constructing a Most Probable Mode (MPM) list is described. The method comprises: determining whether a left block of a current coding block is available or not, if the left block of the current coding block is available, adding an intra prediction mode of the left block into an MPM list; determining whether an above block of the current coding block is available or not, if the above block of the current coding block is available, adding an intra prediction mode of the above block into the MPM list; if a planar mode is not in the initial MPM list, adding the planar mode into the MPM list; if a DC mode is not in the initial MPM list, adding the DC mode into the MPM list.

In another aspect, a method for constructing an MPM list is described. The method comprises: determining whether a left block of a current coding block is available or not, if the left block of the current coding block is available, adding an intra prediction mode of the left block into an MPM list; determining whether an above block of the current coding block is available or not, if the above block of the current coding block is available, adding an intra prediction mode of the above block into the MPM list; adding an offset to at least one of the prediction mode of the left block and the prediction mode of the above block to obtain at least one new prediction mode, if the at least one of the left block of the current block and the above block of the current block is available and the intra prediction mode of the at least one of the left block and the above block is an angular mode; and adding the at least one new prediction mode into the MPM list if the at least one new prediction mode is not in the MPM list In yet another aspect, a method for constructing an MPM list is described. The method comprises: determining whether a left block of a current coding block is available or not, if the left block of the current coding block is available, adding an intra prediction mode of the left block into an MPM list; determining whether an above block of the current coding block is available or not, if the above block of the current coding block is available, adding an intra prediction mode of the above block into the MPM list; adding an offset to the prediction mode of the left block to obtain a new prediction mode, if the left block of the current coding block is available and the intra prediction mode of the left block is an angular mode; and adding the new prediction mode into the MPM list, if the new prediction mode is not in the MPM list; and/or adding an offset to the prediction mode of the above block to obtain an above-offset prediction mode, if the above block of the current coding block is available and the intra prediction mode of the above block is an angular mode; and adding the above-offset prediction mode into the MPM list, if the above-offset prediction mode is not in the MPM list.

In other words, either (i) a new prediction mode derived by adding an offset to the prediction mode of the left block of the current block is added to the list of MPMs, or (ii) a new prediction mode (the above-offset prediction mode) derived by adding an offset to the prediction mode of the above block of the current block is added to the list of MPMs, or (iii) the new prediction mode of the left block of the current block and a further new prediction mode (the above-offset prediction added the list of MPMs). In every case, the new prediction mode and/or the above-offset prediction mode is added to the list of MPMs if not already present within the list of MPMs and if the left or above block, respectively, are available and their prediction modes are angular intra-prediction modes.

Note that the list of MPMs is not necessarily completed by the above described method, and further prediction modes may be added. For example, one or more offsets may be added to the intra prediction mode of the left block and/or the intra prediction mode of the above block. The new one or more prediction modes determined by adding the one or more offsets to the prediction mode of the left and/or above block are added to the list of MPMs.

Note that the order of adding the new prediction mode and the above-offset prediction mode is not limited to first adding the new prediction mode and then adding the above-offset prediction mode but may be switched, i.e. first adding the above-offset prediction mode and then adding the new prediction mode.

In one embodiment, when the prediction mode of the left block is not an intra prediction mode, the left block of the current coding block is not available. For example, in a case where the prediction mode of the left block is an inter prediction mode, the left block of the current coding block is not available.

In one embodiment, when the current coding block is a coding block located in the left-most side of a frame, the left block of the current coding block is not available. That is, in a case where the left block does not exist as the current block is the most left block in the current frame, the left block is not available.

In one embodiment, parallel processing is supported and the current coding block is a coding block located in the left-most side of a Tile, the left block of the current coding block is not available.

In one embodiment, parallel processing is not supported and the current coding block is a coding block located in the left-most side of a Tile, the left block of the current coding block is available. In other words, even when the left block of the current coding block is located in a different tile, it may be considered available if an encoder or decoder does not support parallel processing.

In one embodiment, parallel processing is supported and the current coding block is a coding block located in the left-most side of a slice, the left block of the current coding block is not available.

In one embodiment, parallel processing is not supported and the current coding block is a coding block located in the left-most side of a slice, the left block of the current coding block is available. In other words, even when the left block of the current coding block is located in a different slice, it may be considered available if an encoder or decoder does not support parallel processing.

In one embodiment, when the prediction mode of the above block is not an intra prediction mode, the above block of the current coding block is not available. For example, in a case where the prediction mode of the above block is an inter prediction mode, the above block of the current coding block is not available.

In one embodiment, when the current coding block is a coding block located in the top-most side of a frame, the above block of the current coding block is not available. That is, in a case where the above block does not exist as the current block is the top most block in the current frame, the left block is not available.

In one embodiment, parallel processing is supported and the current coding block is a coding block located in the top-most side of a Tile, the above block of the current coding block is not available.

In one embodiment, parallel processing is not supported and the current coding block is a coding block located in the top-most side of a Tile, the above block of the current coding block is available. In other words, even when the above block of the current coding block is located in a different tile, it may be considered available if an encoder or decoder does not support parallel processing.

In one embodiment, parallel processing is supported and the current coding block is a coding block located in the top-most side of a slice, the above block of the current coding block is not available.

In one embodiment, parallel processing is not supported and the current coding block is a coding block located in the top-most side of a slice, the above block of the current coding block is available. In other words, even when the above block of the current coding block is located in a different slice, it may be considered available if an encoder or decoder does not support parallel processing.

In one embodiment, when line buffer size needs to be constrained and the current coding block is a coding block located in the top-most side of a current CTU, the above block of the current coding block is not available.

In one embodiment, the method further comprises: if the left block of the current coding block is available and the prediction mode of the left block is an angular mode, adding an offset to the prediction mode of the left block to obtain an new prediction mode, if the new prediction mode is not in the initial MPM list, adding the new prediction mode into the MPM list.

In one embodiment, the offset is −1.

In one embodiment, the offset is +1.

In one embodiment, the method further comprises: if the above block of the current coding block is available and the prediction mode of the above block is an angular mode, adding an offset to the prediction mode of the above block to obtain an above-offset prediction mode, if the above-offset prediction mode is not in the initial MPM list, adding the above-offset prediction mode into the MPM list.

In one embodiment, the offset is −1.

In one embodiment, the offset is +1.

In one embodiment, the method further comprises: adding a vertical mode (VER_IDX), a horizontal mode (HOR_IDX), an intra mode 2 (2), a vertical diagonal mode (VDIA_IDX) or a diagonal mode (DIA_IDX) into the MPM list.

In one aspect, an encoder is provided where the encoder comprises processing circuitry for carrying out any one of the above methods.

In one aspect, a decoder is provided where the decoder comprises processing circuitry for carrying out any one of the above methods.

In one aspect, a computer program product is provided where the computer program product comprises a program code for performing any one of the above methods. For example, the computer program product comprises instruction, when the program is executed by a computer or processor, cause the computer to carry out the steps of any one of above methods.

In one aspect, a decoder for constructing an MPM list is provided, where the decoder comprises: one or more processors; and a non-transitory computer-readable storage medium coupled to the processors and storing programming for execution by the processors, where the programming, when executed by the processors, configures the decoder to carry out any one of the above methods.

In one aspect, an encoder for constructing an MPM list is provided, where the encoder comprises: one or more processors; and a non-transitory computer-readable storage medium coupled to the processors and storing programming for execution by the processors, where the programming, when executed by the processors, configures the encoder to carry out any one of the above methods.

The present disclosure provides improvement in the intra mode signaling scheme. Herein, a video decoding method and a video decoder are provided.

In one embodiment, the video decoding method comprises: decoding an encoded data of a picture block to obtain an intra prediction mode from a plurality of intra prediction modes for the picture block, the plurality of intra prediction modes for the picture block comprises a set of MPMs, and a set of non-MPM, where the set of non-MPM comprises a first set of intra prediction modes and a second set of intra prediction modes, where one mode in the first set of intra prediction modes is encoded using N bits, one mode in the second set of intra prediction modes is encoded using M bits, N and M are positive integers, N is less than M, where the decoding the encoded data to obtain an intra prediction mode from a plurality of intra prediction modes for the picture block comprises: decoding the encoded data to obtain an indication indicating whether the intra-prediction mode for the picture block is in the set of MPMs or not; if the indication indicating the intra prediction mode for the picture block is not in the set of MPMs, generating a mapping relationship between at least one intra prediction mode in the first set of intra prediction modes and at least one intra prediction mode in the set of non-MPM; decoding the encoded data to obtain an intra prediction mode codeword for the picture block; obtaining the intra prediction mode for the picture block according to the mapping relationship and the intra prediction mode codeword.

According to the video decoding method described herein, a truncated binarization scheme is used to code prediction modes in the set of non-MPM, and a mapping relationship is generated, hence the prediction mode for the current block have a higher possibility to be coded use less bits and the computational complexity in the decoder side is reduced.

In one embodiment, the method further comprises receiving the encoded data of the picture block. In one embodiment, the encoded data is received by the decoder side before decoding the encoded data. In one embodiment, the encoded data is received by a receiver.

In one embodiment, a quantity of the plurality of intra prediction modes for the picture block is 67, where the plurality of intra prediction modes of 67 intra prediction modes comprise: planar mode (value 0), dc mode (value 1), and angular modes with values 2 to 66. A quantity of the plurality of intra prediction modes for the picture block may be other values such as 35, 48, 71, and so on.

In one embodiment, a quantity of the set of MPMs is 6, a quantity of the set of non-MPM is 61, a quantity of the first set of intra prediction modes is 3 and a quantity of the second set of intra prediction modes is 58.

In another embodiment, a quantity of the set of MPMs is 3, a quantity of the set of non-MPM is 64, a quantity of the first set of intra predication modes is 3 or 6, and a quantity of the second set of intra predication modes is 61 or 58.

In one embodiment, N=5, M=6; in another example, N=2, M=6.

In one embodiment, each mode in the first set of intra prediction modes is encoded using N bits, each mode in the second set of intra prediction modes is encoded using M bits.

In one embodiment, intra prediction modes in the first set of intra prediction modes are coded using a truncated binarization scheme, at least one mode in the first set of intra prediction modes is encoded using N bits, and at least one mode in the first set of intra prediction modes is encoded using less than N bits.

In one embodiment, the indication indicating the intra prediction mode for the picture block is in the set of MPMs or not is a flag, when the value of the flag is 1 may indicate that the intra-prediction mode for the picture block is in the set of MPMs, when the value of the flag is 0 may indicate that the intra-prediction mode for the picture block is not in the set of MPMs. For example, at the encoder side, if a MPM list is a set of intra modes say: [20,40, 60] and the current blocks intra mode value is 40, then the MPM flag indicator is set to 1 as the intra mode for the current block is found at the second entry of the MPM list. If for e.g. the current blocks intra mode is 41 instead of 40, then the MPM flag indicator is set to 0, the MPM flag is sent to the decode side in the encoded data.

In one embodiment, if the indication indicating the intra prediction mode for the picture block is in the set of MPMs. The derivation process for the intra prediction mode for the picture block (IntraPredModeY[xPb][yPb]) is defined as follows:

If intra_luma_mpm_flag[xPb][yPb] is equal to 1 (which indicates the intra prediction mode for the picture block is in the set of MPMs), the IntraPredModeY[xPb][yPb] is set equal to candModeList[intra_luma_mpm idx[xPb][yPb]], where (xPb, yPb) specifies the top-left sample of the current luma prediction block relative to the top-left luma sample of the current picture, and candModeList is the actual MPM list, decoding the encoded data to obtain an MPM index, obtaining the intra prediction mode of the picture block according to the MPM index and the MPM list.

In one embodiment, the set of MPMs is (15, 0, 20), the value of the MPM index is 2, so the intra prediction mode of the picture block is planar mode (value 0). In another embodiment, the set of MPMs is (15, 36, 0, 1, 21, 19), the value of the MPM index is 5, so the intra prediction mode of the picture block is angular mode 21.

In one embodiment, one of the at least one intra prediction mode in the first set of intra prediction modes correspondent to one of the at least one intra prediction mode in the set of non-MPM.

In one embodiment, prediction modes in the first set of intra prediction modes are (17, 25, 6), and the mapped prediction modes in the set of non-MPM are (2, 3, 4), 17← →2, 25← →3, 6← →4.

In another embodiment, prediction modes in the first set of intra prediction modes are (2, 16, 28), and the mapped prediction modes in the set of non-MPM are (2, 3, 4), 2← →2 16← →3, 28← →4.

In yet another embodiment, prediction modes in the first set of intra prediction modes are (28), and the mapped prediction modes in the set of non-MPM are (3), 28← →3.

In one embodiment, the mapping relationship is generated according to the set of MPMs.

In one embodiment, the mapping relationship is generated according to classify the prediction modes in the set of MPMs.

In one embodiment, the generating a mapping relationship between at least one intra prediction mode in the first set of intra prediction modes and at least one intra prediction mode in the set of non-MPMs, comprising: ranking a plurality of intra prediction mode categories according to the number and/or the direction of intra prediction modes in the set of MPMs falling within each intra prediction mode category; generating the mapping relationship according to the highest ranked intra prediction mode category.

In an embodiment, 5 angular intra prediction mode categories, namely dc mode (DC_IDX), vertical mode (VER_IDX), horizontal mode (HOR_IDX), intra mode 2 (2), vertical diagonal mode (VDIA_IDX) and diagonal mode DIA_IDX, where an angular intra prediction mode of the most probable modes list falling within each angular intra prediction mode category, for example, corresponds to associating each of the angular intra prediction modes of the most probable modes list to the angular intra prediction mode category being closest to the corresponding angular intra prediction mode of the most probable modes list. In another embodiment, repeating this step with the second highest ranked angular intra prediction mode category.

In one embodiment, the generating a mapping relationship between a intra prediction mode in the first set of intra prediction modes and a intra prediction mode in the second a set of intra prediction modes, comprises: generating an initial set of intra prediction modes according to add an offset to a plurality of values corresponding to the set of MPMs; classifying the set of MPMs to obtain an highest ranked intra prediction mode category; generating the mapping relationship according to the highest ranked intra prediction mode category and the initial set of intra prediction modes.

In one embodiment, the initial set of intra prediction modes is generated according to add an offset of −1, +1, +2, −2, +3, −3, +4 or −4 to a plurality of values corresponding to the set of MPMs.

In one embodiment, the mapping relationship is generated according to a predetermined default mode list comprising or consisting of a planar mode (PLANAR IDX), a dc mode (DC_IDX), a vertical mode (VER_IDX), an horizontal mode (HOR_IDX), an intra mode 2 (2), a vertical diagonal mode (VDIA_IDX), and a diagonal mode (DIA_IDX).

FIG. 6 is a diagram illustrating an example of first three modes in remaining mode list generation process. In FIG. 6, an example of 67 intra prediction modes is shown, e.g., as proposed for VVC. The intra prediction modes of 67 intra prediction modes comprise: planar mode (index 0), dc mode (index 1), and angular modes with indices 2 to 66, where the left bottom angular mode in FIG. 6 refers to index 2 and the numbering of the indices being incremented until index 66 being the top right most angular mode of FIG. 6.

In an embodiment, an intra mode signaling scheme with 6 MPMs and remaining 61 modes is proposed, where the remaining 61 modes are coded using a truncated binarization scheme. The remaining 61 intra modes can also be coded using a fixed length code of 6 bits, but the disadvantage with the fixed length code of 6 bits is that out of the 64 possible codewords, only 61 codewords are used and 3 remaining code words are not used. Instead of a fixed length code, truncated binarization is proposed, which would use only 5 bits to signal the first 3 remaining modes and the remaining 58 modes are then coded using 6 bits.

Truncated binarization allows the smaller code words to be signaled using fewer bits when compared to the bigger code words. For example, as shown in FIG. 6, the horizontal modes starting with "intra modes 2, 3, 4 . . . " will most often get signaled using 5 bits. Therefore, for efficient signaling of remaining modes (non-MPM modes), the first few non-MPM code words are mapped to the derived modes which are more probable. For example, the MPM list size is 6 and the intra modes which are included in the MPM list are [18, 30, 0, 1, 66, 24], then the first three modes in the non-MPM modes which require only 5 bits for signaling are modes [2,3,4]. As an example, assume the modes [2, 3, 4] are named as "code word intra modes". Since modes 2, 3, 4 may not be highly probable modes, these modes are mapped to represent three other intra modes which are more probable. For example, assume after the 6 most probable modes in the MPMs, three other modes which are more probable are mode numbers [19, 17, 21].]. Assume the modes [19, 17, 21] are named as "derived non-MPM modes". Then a simple way to make sure that modes 19, 17, 21 consume only 5 bits is to map the intra modes [2, 3, 4] with intra modes [19, 17, 21]. Basically, the encoder makes the mapping and signals intra modes 19 with intra mode 2 and then the decoder makes the inverse mapping and maps intra mode 2 with intra mode 19. Moreover, this simple mapping reduces the number of pruning operations to signal the non-MPM modes when compared to signaling the non-MPM modes by using a list and signaling the index into the list. In some embodiments, if the "derived non-MPM modes" and "code word intra modes" with smallest code word have an overlap, then it is made sure that the common intra mode among both the lists are mapped together. For example, if the "code word intra modes" is [2, 3, 4] and "derived non-MPM modes" list is [2, 4, 17], then the intra mode 2 is mapped to intra mode 2, mode 3 is mapped to mode 17, and mode 4 is mapped to mode 4.

Several solutions are proposed to fill the first three modes of the remaining modes list.

The first three modes in the remaining modes list can be filled in several possible ways.

First, by using the modes from a predetermined default mode list which is {planar mode (PLANAR IDX), dc mode (DC_IDX), vertical mode (VER_IDX), horizontal mode (HOR_IDX), intra mode 2 (2), vertical diagonal mode (VDIA_IDX), diagonal mode (DIA_IDX)} (the terms in the brackets show the corresponding terms in FIG. 6, further details about FIG. 6 are described herein below);

Second, by using offsets to the angular modes which are already present in the MPM list. Here, the offset can be +/−N, where N is a possible integer value whose value is {1, 2, 3, 4}. The offsets could be added only to the first two angular modes from the MPM list.

Figure 7:
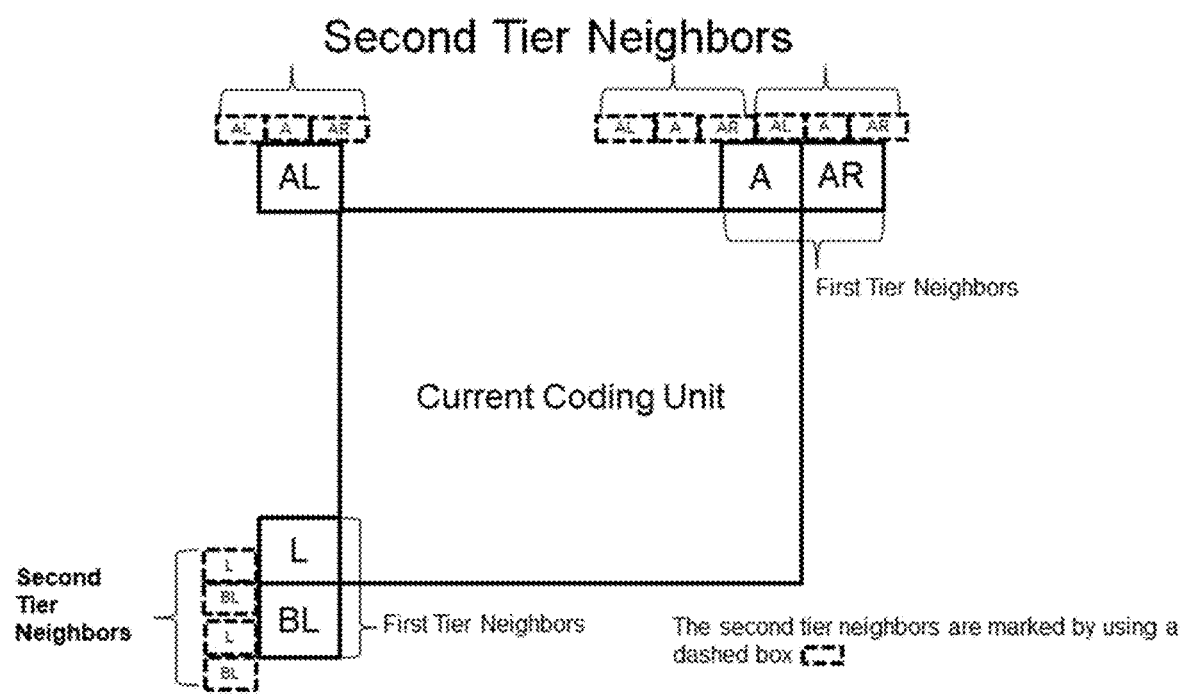
FIG. 7 is a diagram illustrating second tier neighboring blocks intra modes used for deriving the first three modes in remaining modes list.

Third, the intra modes of non-adjacent neighbors can also be used to fill the three modes. As shown in FIG. 7, second tier neighbors intra modes can used.

Fourth, as shown in FIG. 6, in a first step, a given mode from MPM list is taken and is checked if it is "nearby" to one of the following mode categories {DC_IDX, HOR_IDX, DIA_IDX, VER_IDX, VDIA_IDX}, in second step, the mode categories are then "sorted" based on the "majority" of modes which are close to it. In a third step, the remaining modes list is generated by inserting modes which are nearby to the winning mode category from step 2.

In one embodiment, the generating a mapping relationship between at least one intra prediction mode in the first set of intra prediction modes and at least one intra prediction mode in the set of non-MPM, comprises: generating a first set of values according to values of prediction modes in the set of MPMs, one value in the first values set is the smallest value of prediction mode in the set of non-MPM; generating a second set of values according to adding an offset to value of at least one prediction mode in the set of MPMs; generating the mapping relationship according to the first set of values and the second set of values.

In one embodiment, the decoder side first obtain the set of MPM for the current block, the generating process can refer to the related part in the ITU H.264, ITU H.265 or the above description about constructing the candModeList. After obtained the set of MPMs, the decoder side select the smallest value of prediction mode in the set of non-MPM as one value in the first values set.

In an embodiment, the first set of values comprise three smallest values in the set of non-MPM, if the values of prediction modes in the set of MPMs are (0, 1, 3, 5, 8, 10), then the first set of values are (2, 4, 6).

In another embodiment, the first set of values comprise two smallest values in the set of non-MPM, if the values of prediction modes in the set of MPMs are (0, 1, 3, 5, 8, 10), then the first set of values are (2, 4).

In an embodiment, an offset of −1, +1, +2, −2, +3, −3, +4 or −4 is added to a plurality of values corresponding to the set of MPMs.

In one embodiment, the generating a mapping relationship between at least one intra prediction mode in the first set of intra prediction modes and at least one intra prediction mode in the set of non-MPM, comprises: generating a first set of values according to values of prediction modes in the set of MPMs, one value in the first values set is the smallest value of prediction mode in the set of non-MPM; generating a second set of values according to adding an offset to value of at least one angular prediction mode in the set of MPMs; generating the mapping relationship according to the first set of values and the second set of values.

In an embodiment, an offset of −1, +1, +2, −2, +3, −3, +4 or −4 is added to at least one value corresponding to at least one angular prediction mode in the set of MPMs.

In another embodiment, an offset of −1, +1, +2, −2, +3, −3, +4 or −4 is added to values corresponding to two angular prediction modes in the set of MPMs.

In one embodiment, a quantity of prediction modes in the plurality of intra prediction modes for the picture block is 67, a quantity of prediction modes in the set of MPMs is 6, a quantity of prediction modes in the first set of intra prediction modes in the set of non-MPM is 3 and a quantity of prediction modes in the second set of intra prediction modes in the set of non-MPM is 58, where the generating a mapping relationship between at least one intra prediction mode in the first set of intra prediction modes and at least one intra prediction mode in the set of non-MPM, comprises: obtaining the smallest three values of three prediction modes in the set of non-MPM according to the values of prediction modes in the set of MPMs; obtaining two values of two angular prediction modes in the set of MPM, adding offset to the two values to obtain offset values; obtaining a second set of values according to the values of prediction modes in the set of MPMs and the offset values; generating the mapping relationship according to the first set of values and the second set of values.

In one embodiment, the generating a mapping relationship between at least one intra prediction mode in the first set of intra prediction modes and at least one intra prediction mode in the set of non-MPM, comprises: generating a first set of values according to values of prediction modes in the set of MPMs, one value in the first values set is the smallest value of prediction mode in the set of non-MPM; generating a second set of values according to a predetermined default mode list comprising or consisting of a vertical mode (VER_IDX), an horizontal mode (HOR_IDX), an intra mode 2 (2), a vertical diagonal mode (VDIA_IDX), and a diagonal mode (DIA_IDX); generating the mapping relationship according to the first set of values and the second set of values.

In an embodiment, an offset of −1, +1, +2, −2, +3, −3, +4 or −4 is added to at least one value corresponding to at least one prediction mode in the predetermined default mode list.

In an embodiment, an offset of −1, +1, +2, −2, +3, −3, +4 or −4 is added to at least one value corresponding to at least one angular prediction mode in the predetermined default mode list.

In an embodiment, an offset of −1, +1, +2, −2, +3, −3, +4 or −4 is added to two values corresponding to two angular prediction modes in the predetermined default mode list.

In one embodiment, the generating a mapping relationship between at least one intra prediction mode in the first set of intra prediction modes and at least one intra prediction mode in the set of non-MPM, comprises: generating a first set of values according to values of prediction modes in the set of MPMs, one value in the first values set is the smallest value of prediction mode in the set of non-MPM; generating a second set of values according to a predetermined default mode list comprising or consisting of a planar mode (PLANAR_IDX), a dc mode (DC_IDX), a vertical mode (VER_IDX), an horizontal mode (HOR_IDX), an intra mode 2 (2), a vertical diagonal mode (VDIA_IDX), and a diagonal mode (DIA_IDX); generating the mapping relationship according to the first set of values and the second set of values.

In one embodiment, the intra prediction mode codeword is encoded using 5 bits, and the intra prediction mode codeword is one of 00000, 00001 or 00010.

In an embodiment, the decode side decoding the codeword to obtain an initial value, for example, if the codeword is 00001, then the initial value is 1.

Then compare with the initial value with each value corresponding to the prediction mode in the set of MPMs, if the initial value is greater than or equal to the value corresponding to the prediction mode in the set of MPMs, the initial value increment by one, repeat this step until all the values in the set of MPMs have been compared with the initial value, and obtain a final value.

For example, adjust the values corresponding to the set of MPMs in an ascending order, the adjusted values corresponding to the set of MPMs is (0, 1, 4, 6, 8, 10); the codeword is 00001, in the first step, as 1 is greater than the first value corresponding to the set of MPMs, this initial value 1 is increment by one, and a amend value is 2; in the second step, as 2 is greater than in the second value corresponding to the set of MPMs, another amend value 3 is obtained according increment one to 2; and as 3 is smaller than the third value corresponding to the set of MPMs, a final value 3 is obtained. And if the final value 3 is not in the mapping set, the final value 3 is the value corresponding to the intra prediction mode of the picture block, so the intra prediction mode of the picture block is angular mode 3.

If the final value 3 is in the mapping set, a mapped value (e.g. 17) is the value corresponding to the intra prediction mode of the picture block, so the intra prediction mode of the picture block is angular mode 17. In some example, a mapped value can same as the final value, for example, if the final value 3 is in the mapping set, a mapped value is also, so the intra prediction mode of the picture block is angular mode 3.

In another aspect, a decoder comprising processing circuitry is disclosed for carrying out the above decoding methods.

In yet another aspect, a computer program product is disclosed which comprising a program code for performing the above decoding methods.

In still another aspect, a decoder for decoding video data is disclosed, where the decoder comprises: one or more processors; and a non-transitory computer-readable storage medium coupled to the processors and storing programming for execution by the processors, where the programming, when executed by the processors, configures the decoder to carry out the above decoding methods.

The processing circuitry can be implemented in hardware, or in a combination of hardware and software, for example by a software programmable processor or the like.

In another aspect, an encoding method is disclosed, where the encoding method comprises:

Obtaining a intra prediction mode of a picture block from a plurality of intra prediction mode, the plurality of intra prediction modes for the picture block comprises a set of MPMs, and a set of non-MPM, where the set of non-MPM comprises a first set of intra prediction modes and a second set of intra prediction modes.

If the intra prediction mode of the picture block is in the set of non-MPM, generating a mapping relationship between at least one intra prediction mode in the first set of intra prediction modes and at least one intra prediction mode in the set of non-MPM.

Encoding the intra prediction mode of the picture block to obtain an intra prediction mode codeword according to the mapping relationship.

In one embodiment, the process of obtaining a intra prediction mode of a picture block can refers to the relative disclosure in the below detailed description of embodiments part, or the relative disclosure in the field of video coding technology, such as in the ITU-T H.264, ITU-T H.265.

In one embodiment, the encoding method further comprises: generating a set of MPMs, determining whether the intra prediction mode of the picture block is in the set of MPMs. Hence, if the intra prediction mode of the picture block is not in the set of MPMs, then the intra prediction mode of the picture block is in the set of non-MPM.

The process of generating a set of MPMs can refer to the relative disclosure in the description part, or the relative disclosure in the field of video coding technology, such as in the ITU-T H.264, ITU-T H.265.

In one embodiment, the process of generating a mapping relationship between at least one intra prediction mode in the first set of intra prediction modes and at least one intra prediction mode in the set of non-MPM can refers to the relative disclosure in the decoding side.

In one embodiment, a first set of intra prediction modes is coded using 5 bits and a second set of intra prediction modes is coded using 6 bits.

In another embodiment, an encoder comprising processing circuitry is provided for carrying out the above encoding methods.

In yet another embodiment, a computer program product is provided which comprises program code for performing the above encoding methods.

In another aspect, an encoder for encoding video data is provided, where the encoder comprises: one or more processors; and a non-transitory computer-readable storage medium coupled to the processors and storing programming for execution by the processors, where the programming, when executed by the processors, configures the encoder to carry out the above encoding methods.

The processing circuitry can be implemented in hardware, or in a combination of hardware and software, for example by a software programmable processor or the like.

Figure 8:
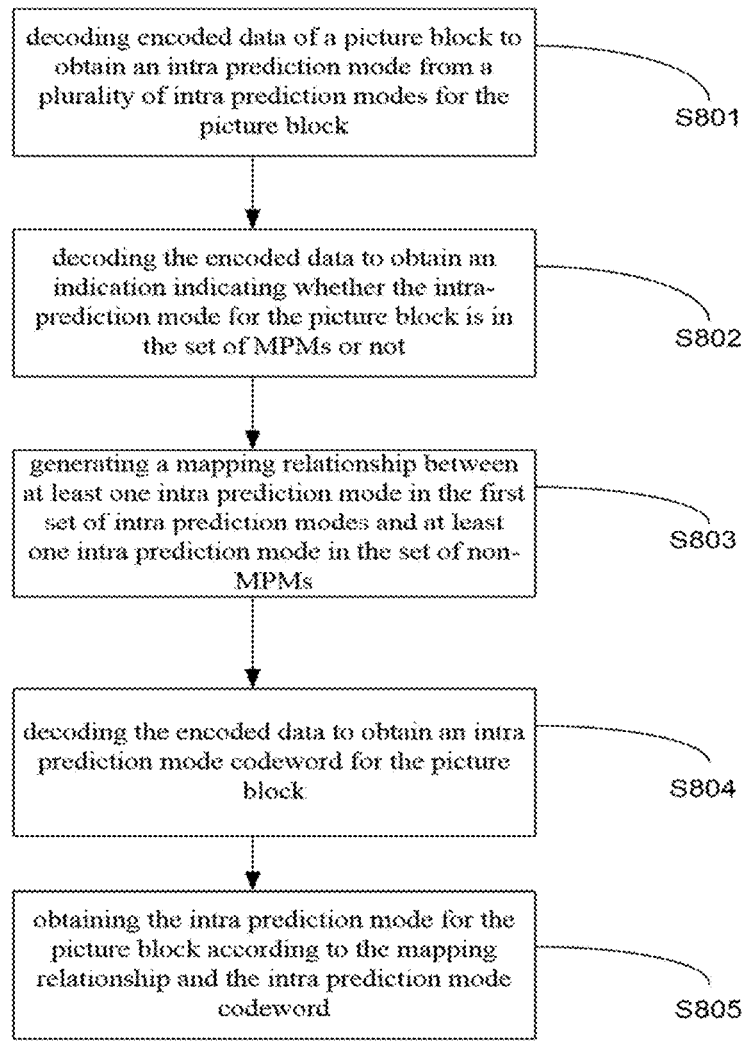
FIG. 8 is a flow diagram illustrating an example of a video decoding method according to one embodiment.

FIG. 8 is a flow diagram illustrating an example of a video decoding method according to one embodiment. Referring to FIG. 8, in one embodiment, the video decoding method comprises:

S801: decoding an encoded data of a picture block to obtain an intra prediction mode from a plurality of intra prediction modes for the picture block;

the plurality of intra prediction modes for the picture block comprises a set of MPMs, and a set of non-MPM, where the set of non-MPM comprises a first set of intra prediction modes and a second set of intra prediction modes, where one mode in the first set of intra prediction modes is encoded using N bits, one mode in the second set of intra prediction modes is encoded using M bits, N and M are positive integers, N is less than M.

In one embodiment, the decoding of the encoded data to obtain the intra prediction mode from the plurality of intra prediction modes for the picture block (S801) comprises:

S802: decoding the encoded data to obtain an indication indicating whether the intra-prediction mode for the picture block is in the set of MPMs or not; if the indication indicating the intra prediction mode for the picture block is not in the set of MPMs, S803: generating a mapping relationship between at least one intra prediction mode in the first set of intra prediction modes and at least one intra prediction mode in the set of non-MPM;

S804: decoding the encoded data to obtain an intra prediction mode codeword for the picture block;

S805: obtaining the intra prediction mode for the picture block according to the mapping relationship and the intra prediction mode codeword.

According to the video decoding method described herein, a truncated binarization scheme may be used to code prediction modes in the set of non-MPM, and a mapping relationship is generated, hence the prediction mode for the current block have a higher possibility to be coded use less bits and the computational complexity in the decoder side is reduced.

Figure 9:
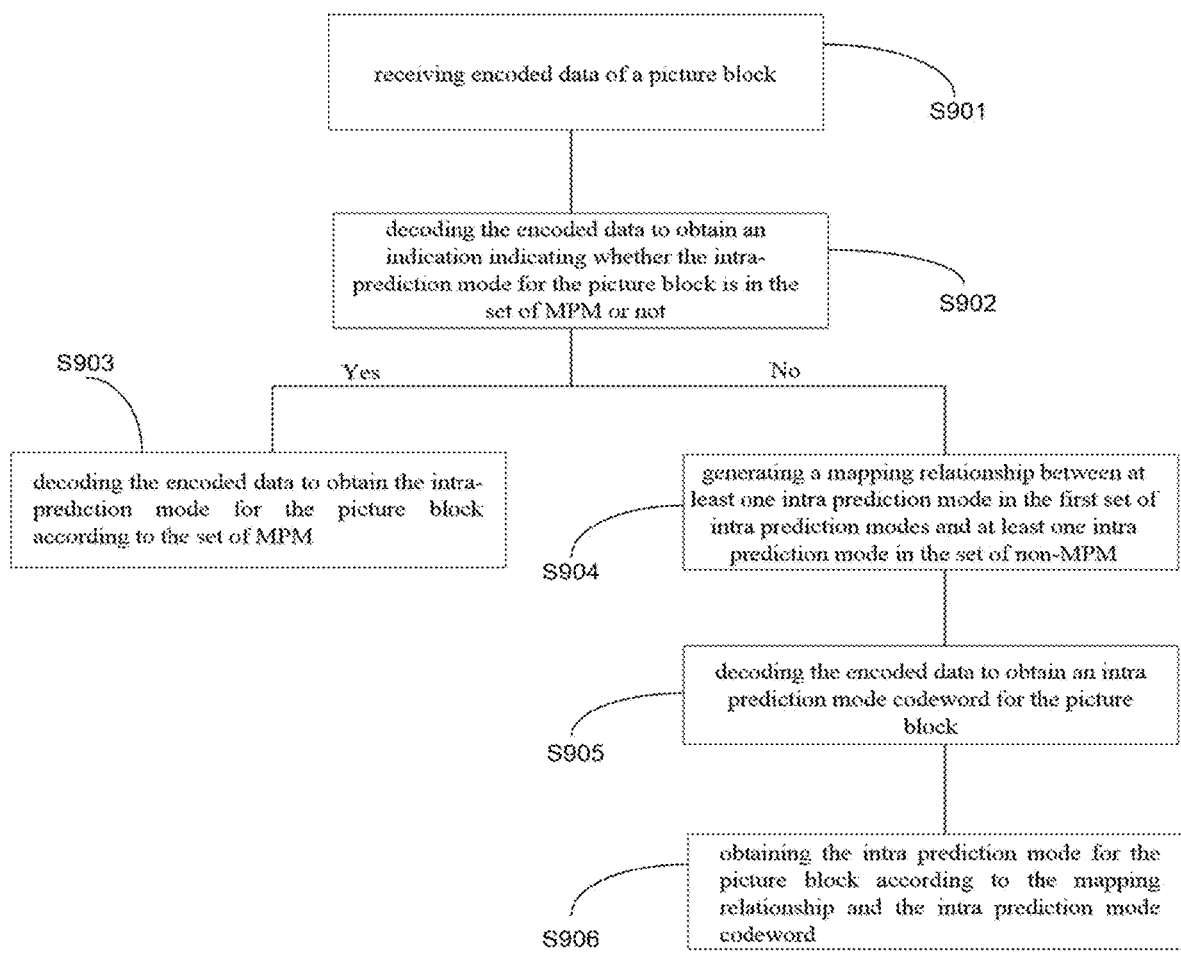
FIG. 9 is another flow diagram illustrating an example of a video decoding method according to one embodiment.

FIG. 9 is another flow diagram illustrating an example of a video decoding method according to one embodiment. Referring to FIG. 9, in one embodiment, the video decoding method comprises:

S901: receiving encoded data of a picture block.

The decoder side may be configured to receive the encoded picture data via a direct communication link between the encoder side and the decoder side, e.g. a direct wired or wireless connection, or via any kind of network, e.g. a wired or wireless network or any combination thereof, or any kind of private and public network, or any kind of combination thereof.

S902: decoding the encoded data to obtain an indication indicating whether the intra-prediction mode for the picture block is in the set of MPMs or not.

The indication, indicating whether the intra prediction mode for the picture block is in the set of MPM or not, may be a flag. When the value of the flag is 1 may indicate that the intra-prediction mode for the picture block is in the set of MPMs, when the value of the flag is 0 may indicate that the intra-prediction mode for the picture block is not in the set of MPMs. For example, at the encoder side, if an MPM list (a set of MPMs) is a set of intra modes [25, 42, 63] and the current blocks intra mode value is 42, then the MPM flag indicator is set to 1 as the intra mode for the current block is found at the second entry of the MPM list. If for example, the current block's intra mode is 41 instead of 42, then the MPM flag indicator is set to 0, the MPM flag is sent to the decoder side in the encoded data.

If the indication indicating the intra prediction mode for the picture block is in the set of MPMs, perform step S903.

If the indication indicating the intra prediction mode for the picture block is not in the set of MPMs, perform step S904.

S903: decoding the encoded data to obtain the intra-prediction mode for the picture block according to the set of MPMs;

In one embodiment, if the indication indicating the intra prediction mode for the picture block is in the set of MPMs. The derivation process for the intra prediction mode for the picture block (IntraPredModeY[xPb][yPb]) is defined as follows:

If intra_luma_mpm_flag[xPb][yPb] is equal to 1 (which indicates that the intra prediction mode for the picture block is in the set of MPM), the IntraPredModeY[xPb][yPb] is set equal to candModeList[intra_luma_mpm idx[xPb][yPb]], where (xPb, yPb) specifies the top-left sample of the current luma prediction block relative to the top-left luma sample of the current picture, and candModeList is the actual MPM list, decoding the encoded data to obtain an MPM index, obtaining the intra prediction mode of the picture block according to the MPM index and the MPM list.

In one embodiment, the set of MPMs is (15, 0, 20), the value of the MPM index is 2, so the intra prediction mode of the picture block is planar mode (value 0). In another embodiment, the set of MPMs is (15, 36, 0, 1, 21, 19), the value of the MPM index is 5, so the intra prediction mode of the picture block is angular mode 21. The MPM index indicates the position of the intra-prediction mode for the picture block within the set of MPMs.

S904: generating a mapping relationship between at least one intra prediction mode in the first set of intra prediction modes and at least one intra prediction mode in the set of non-MPM.

In an embodiment, if the indication indicating the intra prediction mode for the picture block is not in the set of MPMs, two lists are constructed: namely, a codeword list and derived mode list.

For instance, the first codeword list is constructed as follows:
1. find the smallest mode in the MPM list, assume the smallest mode is Ms.
2. set an initial increment variable Inc=1.
3. set candidate mode Mc as (Ms+Inc), check if mode Mc is also in the MPM list.
   if Mc not in MPM list, add Mc into the codeword list otherwise, go to step 4.
4. check if the inserted entries in codeword list is full (inserted length equals to the length of codeword list):
   If full, terminate;
   Otherwise, set Inc=Inc+1, and go to step 3.

To summarize, the codeword list will contain the smallest modes except the ones that have been present in MPM list. Given the length of MPM list is L, the length of the codeword list is 64-(67-L)=L−3. For example, if the MPM list is (15, 36, 0, 1, 21, 19), then the constructed codeword is (2, 3, 4).

The second derived mode list is constructed as follows:
1. find the first two angular modes in MPM list, assuming found ones are angular0 and angular1.
2. set an initial increment variable Inc=1.

3. derive a new mode $M0_{minus}$=angular0-Inc. Note $M0_{minus}$ shall be guaranteed also an angular mode (i.e. 66>=$M0_{minus}$>=2). Therefore, if angular0 equals to 2, Inc is 1; then the derived $M0_{minus}$ would be 66; If Inc is 2, then $M0_{minus}$ would be 65, etc. The minus operation would wrap up to the maximum angular mode.
4. check if $M0_{minus}$ in the MPM list, if not and if the derived mode list is not full, insert $M0_{minus}$ to derived mode list. Otherwise,
If derived mode list is full, terminate.
Otherwise, go to step 5.
5. derive a new mode $M0_{plus}$=angular0+Inc. Note that $M0_{plus}$ shall be guaranteed also an angular mode (i.e. 66>=$M0_{plus}$>=2). Therefore, if angular0 equals to 66, Inc is 1, then the derived $M0_{plus}$ would be 2, If Inc is 2, then $M0_{plus}$ would be 3, etc. The plus operation would wrap down to the minimum angular mode.
6. check if $M0_{plus}$ in the MPM list, if not and if the derived mode list is not full, insert $M0_{plus}$ to the derived mode list. Otherwise,
If derived mode list is full, terminate.
Otherwise, go to step 7.
7. repeat step 3-6 by replacing angular0 with angular1
8. set Inc=Inc+1, and repeat steps 3-7

To summarize, the derived mode list obtains neighboring modes of the first two angular modes in the MPM list. If these neighboring modes are already included in the MPM list, then they are excluded from the derived mode list. Given the length of MPM list is L, the length of the derived mode list is 64-(67-L)=L-3. An example, if MPM list is (15, 36, 0, 1, 21, 19), then the constructed derived mode list is (14, 16, 35).

When the codeword list and the derived mode list are constructed, a bidirectional mapping relationship between them is built. Namely, given the above example lists with codeword list (2, 3, 4) and derived mode list (14, 16, 35), the bidirectional mapping would be 2←→14, 3←→16, and 3←→35, where ←→ represents bidirectional mapping.

Two options are allowed for building the bidirectional mapping relationship between the codeword list and the derived mode list. The first option is that the derived mode list is allowed to be constructed in a way so that there might be elements both exist in derived mode list and codeword list. The other option is that the derived modes list is not allowed to be overlapped with the modes in the codeword list.

In one embodiment, generating a mapping relationship between at least one intra prediction mode in the first set of intra prediction modes and at least one intra prediction mode in the set of non-MPM, comprises: ranking a plurality of intra prediction mode categories according to the number and/or the direction of intra prediction modes in the set of MPM falling within each intra prediction mode category; generating the mapping relationship according to the highest ranked intra prediction mode category.

In an embodiment, 5 angular intra prediction mode categories, namely vertical mode (VER_IDX), horizontal mode (HOR_IDX), intra mode 2 (2), vertical diagonal mode (VDIA_IDX) and diagonal mode DIA_IDX are provided. An angular intra prediction mode of the most probable modes list falling within each angular intra prediction mode category, for example, corresponds to associating each of the angular intra prediction modes of the most probable modes list to the angular intra prediction mode category being closest to the corresponding angular intra prediction mode of the most probable modes list. In another example, repeating this step with the second highest ranked angular intra prediction mode category.

In an embodiment, the generating a mapping relationship between a intra prediction mode in the first set of intra prediction modes and a intra prediction mode in the second a set of intra prediction modes, comprises: generating an initial set of intra prediction modes according to add an offset to a plurality of values corresponding to the set of MPMs; classifying the set of MPMs to obtain an highest ranked intra prediction mode category; generating the mapping relationship according to the highest ranked intra prediction mode category and the initial set of intra prediction modes.

In an embodiment, the initial set of intra prediction modes is generated according to add an offset of −1, +1, +2, −2, +3, −3, +4 or −4 to a plurality of values corresponding to the set of MPMs.

In an embodiment, the mapping relationship is generated according to a predetermined default mode list comprising or consisting of a planar mode (PLANAR IDX), a dc mode (DC_IDX), a vertical mode (VER_IDX), an horizontal mode (HOR_IDX), an intra mode 2 (2), a vertical diagonal mode (VDIA_IDX), and a diagonal mode (DIA_IDX).

S905: decoding the encoded data to obtain an intra prediction mode codeword for the picture block.

The codeword is encoded by using N bits or M bits in the encoded side. In an example, as it is a bidirectional mapping relationship, so the intra prediction mode corresponding to the codeword may be mapped to another intra prediction mode in the set of non-MPM.

S906: obtaining the intra prediction mode for the picture block according to the mapping relationship and the intra prediction mode codeword.

In an embodiment, after the bidirectional mapping relationship is built, it is checked if the received intra prediction mode corresponding to the intra prediction mode codeword is in the codeword list or the derived mode list.

If the parsed intra prediction mode is neither in codeword list nor the derived mode list, set the final prediction mode as the parsed intra prediction mode.

If the parsed intra prediction mode is only in codeword list or only in derived mode list, then set the final prediction mode as its corresponding mapped intra prediction mode.

If the parsed intra prediction mode is in both codeword list and derived mode list, a mechanism is introduced in the building of these two list, so that bidirectional mapping relationship is adjusted and all the overlapped modes map to themselves in another list. An example: MPM list (0 1 2 3 50 66), codeword list is (4 5 6), derived mode list (4 65 5). When construct derived mode list or codeword list, we make sure 4←Θ4, 5←Θ5, and 6←Θ5.

Further provided is a decoder comprising processing circuitry for carrying out the above methods.

Herein, a computer program product comprising a program code is disclosed for performing the above methods.

Herein, a decoder for decoding video data is disclosed, where the decoder comprises: one or more processors; and a non-transitory computer-readable storage medium coupled to the processors and storing programming for execution by the processors, where the programming, when executed by the processors, configures the decoder to carry out the above methods.

Herein, a video decoding method and a video decoder are provided. The video decoding method comprises: receiving encoded data of a picture block of a coding unit; decoding the encoded data to identify an intra prediction mode from a plurality of intra prediction modes for the picture block, the plurality of intra prediction modes comprise a set of MPMs, a first set of intra prediction modes and a second set of intra prediction modes, where one mode in the first set of intra prediction modes is encoded using N bits, one mode in the second set of intra prediction modes is encoded using M bits, N and M are positive integers, N is less than M, which comprises: decoding the encoded data to obtain an indication indicating whether the intra-prediction mode for the picture block is in the set of MPM or not; if the indication indicating the intra prediction mode for the picture block is not in the set of MPMs, obtaining an intra prediction mode codeword for the picture block, the intra prediction mode codeword corresponding to an initial intra prediction mode;

if the intra prediction mode codeword for the picture block is encoded using N bits, mapping the initial intra prediction mode to obtain a mapped intra prediction mode, using the mapped intra prediction mode as the identified intra prediction mode for the picture block;

and if the intra prediction mode codeword for the picture block is encoded using M bits, using the initial intra prediction mode as the identified intra prediction mode for the picture block.

In one embodiment, a quantity of the plurality of intra prediction modes for the picture block is 67, the plurality of intra prediction modes of 67 intra prediction modes comprising: planar mode (value 0), dc mode (value 1), and angular modes with indices 2 to 66.

In an embodiment, a quantity of the set of MPM is 6, a quantity of the first set of intra prediction modes is 3 and a quantity of the second set of intra prediction modes is 58.

In another embodiment, a quantity of the set of MPMs is 3, a quantity of the first set of intra predication modes is 3 or 6, and a quantity of the second set of intra predication modes is 61 or 58.

In one embodiment, each mode in the first set of intra prediction modes is encoded using N bits, each mode in the second set of intra prediction modes is encoded using M bits.

In one embodiment, intra prediction modes in the first set of intra prediction modes are coded using a truncated binarization scheme, at least one mode in the first set of intra prediction modes is encoded using N bits, and at least one mode in the first set of intra prediction modes is encoded using less than N bits.

In one embodiment, an indication indicating whether the intra-prediction mode for the picture block is in the set of MPM or not is a flag, when the value of the flag is 1 may indicate that the intra-prediction mode for the picture block is in the set of MPMs, when the value of the flag is 0 may indicate that the intra-prediction mode for the picture block is not in the set of MPMs.

In an embodiment, the indication indicating the intra prediction mode for the picture block is in the set of MPMs or not is a flag, when the value of the flag is 1 may indicate that the intra-prediction mode for the picture block is in the set of MPMs, when the value of the flag is 0 may indicate that the intra-prediction mode for the picture block is not in the set of MPMs. For example at the encoder side if the MPM list is a set of intra modes say: [20,40,60] and the current blocks intra mode value is 40, then the MPM flag indicator is set to 1 as the intra mode for the current block is found at the second entry of the MPM list. If for e.g. the current blocks intra mode is 41 instead of 40, then the MPM flag indicator is set to 0.

In one embodiment, if the indication indicating the intra prediction mode for the picture block is in the set of MPMs.

The derivation process is defined as follows: IntraPredModeY[xPb][yPb] is derived by applying the following procedure: If intra_luma_mpm_flag[xPb][yPb] is equal to 1, the IntraPredModeY[xPb][yPb] is set equal to candModeList [intra_luma_mpm idx[xPb][yPb]], where (xPb, yPb) specifies the top-left sample of the current luma prediction block relative to the top-left luma sample of the current picture, and candModeList is the actual MPM list. For example, decoding the encoded data to obtain an MPM index, obtaining the intra prediction mode of the picture block according to the MPM index and the set of MPM. In a specific example, the set of MPM is (15, 0, 20), the value of the MPM index is 2, so the intra prediction mode of the picture block is planar mode (value 0). In another specific example, the set of MPM is (15, 36, 0, 1, 21, 19), the value of the MPM index is 5, so the intra prediction mode of the picture block is angular mode 21.

In one embodiment, an intra prediction mode codeword for the picture block according to decode the encoded data. If the intra prediction mode codeword for the picture block is encoded using M bits, using the initial intra prediction mode as the identified intra prediction mode for the picture block. For example, M is 6, if the intra prediction mode codeword is encoded as 010011 (e.g. 6 bits), which corresponding to angular mode 19, hence, the identified intra prediction mode for the picture block is angular mode 19.

In one embodiment, if the indication indicating the intra prediction mode for the picture block is not in the set of MPMs, two lists are constructed: namely, codeword list and derived mode list.

The first codeword list is constructed as follows:
1. find the smallest mode in the MPM list, assume the smallest mode is Ms
2. set an initial increment variable Inc=1.
3. set candidate mode Mc as (Ms+Inc), check if mode Mc is also in the MPM list.
   if Mc not in MPM list, add Mc into the codeword list; otherwise, go to step 4.
4. check if the inserted entries in codeword list is full (inserted length equals to the length of codeword list):
   If full, terminate;
   Otherwise, set Inc=Inc+1, and go to step 3.

To summarize, the codeword list will contain the smallest modes except the ones that have been present in MPM list. Given the length of MPM list is L, the length of the codeword list is 64-(67-L)=L-3. An example, if MPM list is (15, 36, 0, 1, 21, 19), then the constructed codeword is (2, 3, 4).

The second derived mode list is constructed as follows:
1. find the first two angular modes in MPM list, assuming found ones are angular0 and angular1.
2. set an initial increment variable Inc=1
3. derive a new mode $M0_{minus}$=angular0-Inc. Note $M0_{minus}$ shall be guaranteed also an angular mode (i.e. $66>=M0_{minus}>=2$). Therefore, if angular0 equals to 2, Inc is 1; then the derived $M0_{minus}$ would be 66; If Inc is 2, then $M0_{minus}$ would be 65, etc. The minus operation would wrap up to the maximum angular mode.
4. check if $M0_{minus}$ in the MPM list, if not and if the derived mode list is not full, insert $M0_{minus}$ to derived mode list. Otherwise,
   If derived mode list is full, terminate.
   Otherwise, go to step 5.
5. derive a new mode $M0_{plus}$=angular0+Inc. Note $M0_{plus}$ shall be guaranteed also an angular mode (i.e. $66>=M0_{plus}>=2$). Therefore, if angular0 equals to 66, Inc is 1, then the derived $M0_{plus}$ would be 2, If Inc is 2, then M0$_{plus}$ would be 3, etc. The plus operation would wrap down to the minimum angular mode.

6. check if M0$_{plus}$ in the MPM list, if not and if the derived mode list is not full, insert M0$_{plus}$ to the derived mode list. Otherwise,
If derived mode list is full, terminate.
Otherwise, go to step 7;
7. repeat step 3-6 by replacing angular0 with angular1;
8. set Inc=Inc+1, and repeat step 3-7.

To summarize, the derived mode list obtains neighboring modes of the first two angular modes in the MPM list. If these neighboring modes are already included in the MPM list, then they are excluded from the derived mode list. Given the length of MPM list is L, the length of the derived mode list is 64-(67-L)=L-3. An example, if MPM list is (15, 36, 0, 1, 21, 19), then the constructed derived mode list is (14, 16, 35).

When the codeword list and derived mode list are constructed, a bidirectional mapping relationship between them are built. Namely, given the above example lists with codeword list (2, 3, 4) and derived mode list (14, 16, 35), 2← Θ14, 3← Θ16, and 3← Θ35, where ← Θrepresents bidirectional mapping.

After the bidirectional mapping relationship is built, it is checked if the received intra prediction mode is in the codeword list or the derived mode list:
If the parsed intra prediction mode is neither in codeword list nor the derived mode list, set the final prediction mode as the parsed intra prediction mode.
If the parsed intra prediction mode is only in codeword list or only in derived mode list, then set the final prediction mode as its corresponding mapped intra prediction mode.
If the parsed intra prediction mode is in both codeword list and derived mode list, a mechanism is introduced in the building of these two list, so that bidirectional mapping relationship is adjusted and all the overlapped modes map to themselves in another list. An example: MPM list (0 1 2 3 50 66), codeword list is (4 5 6), derived mode list (4 65 5). When construct derived mode list or codeword list, we make sure 4← Θ4, 5← Θ5, and 6← Θ65.

In one embodiment, an intra prediction mode codeword for the picture block is provided according to decode the encoded data. If the intra prediction mode codeword for the picture block is encoded using N bits, mapping the initial intra prediction mode to obtain a mapped intra prediction mode, using the mapped intra prediction mode as the identified intra prediction mode for the picture block. For example, N is 5, if the intra prediction mode codeword is encoded as 00011 (e.g. 5 bits), which corresponding to angular mode 3, in this example, an initial intra prediction mode is angular mode 3, a mapped intra prediction mode may be DC mode (pre-defined value 1) or angular mode 47; in another example, a mapped intra prediction mode may be the same as the initial prediction mode, for example, the mapped intra prediction mode also is angular mode 3.

In an embodiment, an intra mode signaling scheme with 6 MPMs and remaining 61 modes is provided, where the remaining 61 modes are coded using a truncated binarization scheme. The remaining 61 intra modes can as well be coded using a fixed length code of 6 bits, but a disadvantage with the fixed length code of 6 bits is that out of the 64 possible codewords, only 61 codewords are used and 3 remaining code words are not used. Instead of a fixed length code, truncated binarization is proposed, which would use only 5 bits to signal the first 3 remaining modes and the remaining 58 modes are then coded using 6 bits.

Truncated binarization allows the smaller code words to be signaled using fewer bits when compared to the bigger code words. For example, as shown in FIG. 4, the horizontal modes starting with "intra modes 2, 3, 4 . . ." will most often get signaled using 5 bits. Therefore, for efficient signaling of remaining modes (non-MPM modes), the first few non-MPM code words are mapped to the derived modes which are more probable. For example, the MPM list size is 6 and the intra modes which are included in the MPM list are [18, 30, 0, 1, 66, 24], then the first three modes in the non-MPM modes which require only 5 bits for signaling are modes [2,3,4]. The modes [2, 3, 4] are named as "code word intra modes". Since modes 2, 3, 4 may not be highly probable modes, these modes are mapped to represent three other intra modes which are more probable. For example, after the 6 most probable modes in the MPMs, three other modes which are more probable are mode numbers [19, 17, 21]. The modes [19, 17, 21] are named as "derived non-MPM modes". Then a simple way to make sure that modes 19, 17, 21 consume only 5 bits is to map the intra modes [2, 3, 4] with intra modes [19, 17, 21]. Basically the encoder makes the mapping and signals intra modes 19 with intra mode 2 and then the decoder makes the inverse mapping and maps intra mode 2 with intra mode 19. Moreover, this simple mapping reduces the number of pruning operations to signal the non-MPM modes when compared to signaling the non-MPM modes by using a list and signaling the index into the list. In a special case if the "derived non-MPM modes" and "code word intra modes" with smallest code word have an overlap, then it is made sure that the common intra mode among both the lists are mapped together. For e.g. if the "code word intra modes" is [2, 3, 4] and "derived non-MPM modes" list is [2, 4, 17], then the intra mode 2 is mapped to intra mode 2, mode 3 is mapped to mode 17, and mode 4 is mapped to mode 4.

In another embodiment, several solutions are provided to fill the first three modes of the remaining modes list.

First, by using the modes from a predetermined default mode list which is {planar mode (PLANAR_IDX), dc mode (DC_IDX), vertical mode (VER_IDX), horizontal mode (HOR_IDX), intra mode 2 (2), vertical diagonal mode (VDIA_IDX), diagonal mode (DIA_IDX)} (the terms in the brackets show the corresponding terms in FIG. 6, further details about FIG. 6 are provided below);

Second, by using offsets to the angular modes which are already present in the MPM list. Here, the offset can be +/−N, where N is a possible integer value whose value is {1, 2, 3, 4}. The offsets may be added only to the first two angular modes from the MPM list.

Third, the intra modes of non-adjacent neighbors can also be used to fill the three modes. As shown in FIG. 7, second tier neighbors intra modes can used.

Fourth, as shown in FIG. 6, in a first step, a given mode from MPM list is taken and is checked if it is "nearby" to one of the following mode categories {DC_IDX, HOR_IDX, DIA_IDX, VER_IDX, VDIA_IDX}, in second step, the mode categories are then "sorted" based on the "majority" of modes which are close to it. In a third step, the remaining modes list is generated by inserting modes which are nearby to the winning mode category from step 2.

FIG. 6 shows an example of 67 intra prediction modes, e.g., as proposed for VVC. The plurality of intra prediction modes of 67 intra prediction modes comprise: planar mode (index 0), dc mode (index 1), and angular modes with indices 2 to 66, where the left bottom angular mode in FIG.

6 refers to index 2 and the numbering of the indices being incremented until index 66 being the top right most angular mode of FIG. 6.

A network device is suitable for implementing the disclosed embodiments as described herein is described in the following. The network device comprises ingress ports and receiver units (Rx) for receiving data; a processor, logic unit, or central processing unit (CPU) to process the data; transmitter units (Tx) 1340 and egress ports for transmitting the data; and a memory for storing the data. The network device may also comprise optical-to-electrical (OE) components and electrical-to-optical (EO) components coupled to the ingress ports, the receiver units, the transmitter units, and the egress ports for egress or ingress of optical or electrical signals.

The processor is implemented by hardware and software. The processor may be implemented as one or more CPU chips, cores (e.g., as a multi-core processor), field-programmable gate arrays (FPGAs), application specific integrated circuits (ASICs), and digital signal processors (DSPs). The processor is in communication with the ingress ports, receiver units, transmitter units, egress ports, and memory. The processor comprises a coding module. The coding module implements the disclosed embodiments described above. For instance, the coding module implements, processes, prepares, or provides the various networking functions. The inclusion of the coding module therefore provides a substantial improvement to the functionality of the network device and effects a transformation of the network device to a different state. Alternatively, the coding module is implemented as instructions stored in the memory and executed by the processor.

The memory comprises one or more disks, tape drives, and solid-state drives and may be used as an over-flow data storage device, to store programs when such programs are selected for execution, and to store instructions and data that are read during program execution. The memory may be volatile and/or non-volatile and may be read-only memory (ROM), random access memory (RAM), ternary content-addressable memory (TCAM), and/or static random-access memory (SRAM).

Figure 10:
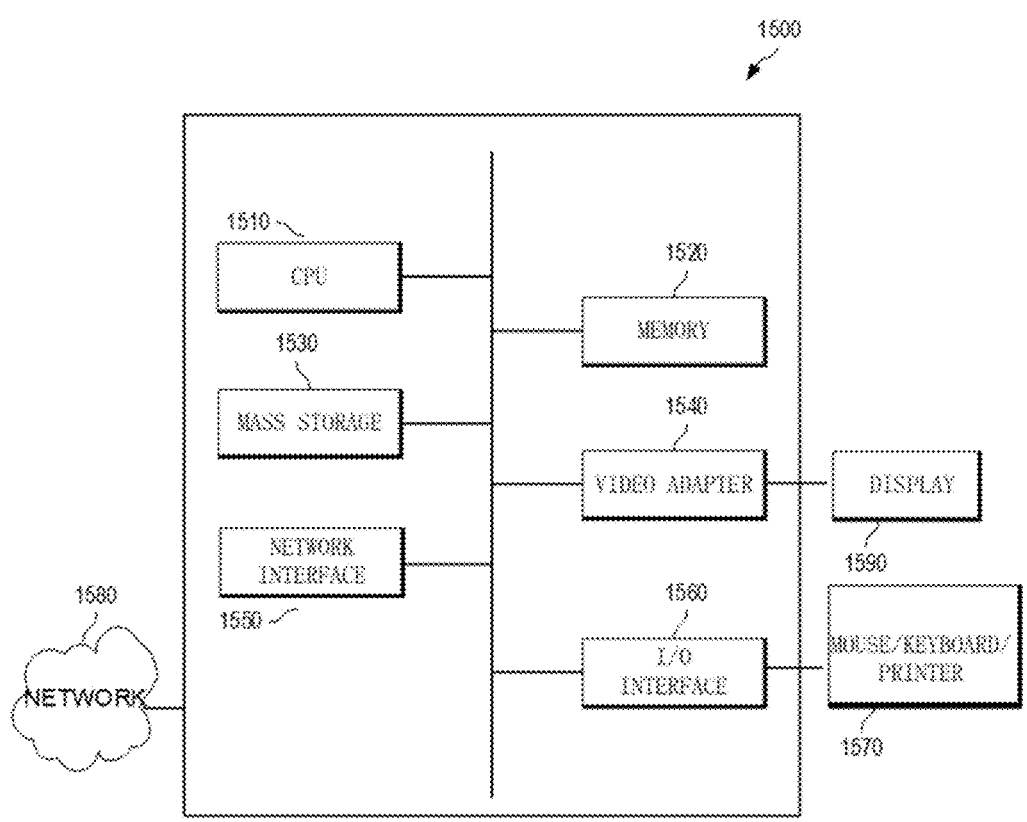
FIG. 10 is a block diagram of an apparatus according to one embodiment.

FIG. 10 is a block diagram of an apparatus that can be used to implement various embodiments. Apparatus 1500 may be the source device 12 as shown in FIG. 1, or the video encoder 20 as shown in FIG. 2, or the destination device 14 as shown in FIG. 1, or the video decoder 30 as shown in FIG. 3. Additionally, the apparatus 1500 can host one or more of the described elements. In some embodiments, the apparatus 1500 is equipped with one or more input/output devices, such as a speaker, microphone, mouse, touchscreen, keypad, keyboard, printer, display, and the like. The apparatus 1500 may include one or more central processing units (CPUs) 1510, a memory 1520, a mass storage 1530, a video adapter 1540, and an I/O interface 1560 connected to a bus. The bus is one or more of any type of several bus architectures including a memory bus or memory controller, a peripheral bus, a video bus, or the like.

The CPU 1510 may have any type of electronic data processor. The memory 1520 may have, or be, any type of system memory such as static random access memory (SRAM), dynamic random access memory (DRAM), synchronous DRAM (SDRAM), read-only memory (ROM), a combination thereof, or the like. In an embodiment, the memory 1520 may include ROM for use at boot-up, and DRAM for program and data storage for use while executing programs. In some embodiments, the memory 1520 is non-transitory. The mass storage 1530 includes any type of storage device that stores data, programs, and other information and to make the data, programs, and other information accessible via the bus. The mass storage 1530 includes, for example, one or more of a solid state drive, hard disk drive, a magnetic disk drive, an optical disk drive, or the like.

The video adapter 1540 and the I/O interface 1560 provide interfaces to couple external input and output devices to the apparatus 1500. For example, the apparatus 1500 may provide SQL command interface to clients. As illustrated, examples of input and output devices include a display 1590 coupled to the video adapter 1540 and any combination of mouse/keyboard/printer 1570 coupled to the I/O interface 1560. Other devices may be coupled to the apparatus 1500, and additional or fewer interface cards may be utilized. For example, a serial interface card (not shown) may be used to provide a serial interface for a printer.

The apparatus 1500 also includes one or more network interfaces 1550, which includes wired links, such as an Ethernet cable or the like, and/or wireless links to access nodes or one or more networks 1580. The network interface 1550 allows the apparatus 1500 to communicate with remote units via the networks 1580. For example, the network interface 1550 may provide communication to database. In an embodiment, the apparatus 1500 is coupled to a local-area network or a wide-area network for data processing and communications with remote devices, such as other processing units, the Internet, remote storage facilities, or the like.

Piecewise linear approximation is introduced in order to calculate the values of weighting coefficients required for predicting pixels within a given block. The piecewise linear approximation, on the one hand, significantly reduces the computational complexity of the distance-weighted prediction mechanism as compared with straightforward weighting coefficient calculation and, on the other hand, helps to achieve higher accuracy of weighting coefficient values as compared with prior-art simplifications.

The embodiments may be applied to other bidirectional and position dependent intra-prediction techniques (e.g., different modifications of PDPC) as well as mechanisms that use weighting coefficients that depend on distance from one pixel to another to blend different parts of a picture (e.g., some blending methods in image processing).

Embodiments comprise, for example, an apparatus for determining an adopted intra prediction mode on the basis of a most probable modes list and a remaining modes list having a first portion and a second portion, where the adopted intra prediction mode is one of a plurality of intra prediction modes comprising a plurality of angular intra prediction modes for predicting sample values of a current picture block, where the apparatus comprises a processing circuitry configured to: generate the first portion of the remaining modes list by including one or more angular intra prediction modes determined on the basis of the most probable modes list such that the one or more angular intra prediction modes of the first portion of the remaining modes list are close to a respective angular intra prediction mode of the most probable modes list; and determine the adopted intra prediction mode, in case the adopted intra prediction mode is part of the first portion of the remaining modes list, using less bits, e.g. for encoding or decoding the adopted intra prediction mode, than in case the adopted intra prediction mode is part of the second portion of the remaining modes list.

In an embodiment, the processing circuitry is configured to generate the first portion of the remaining modes list by: ranking a plurality of angular intra prediction mode categories according to the number and/or the direction of angular intra prediction modes of the most probable modes list falling within each angular intra prediction mode category; and generating a first portion of the remaining modes list by including one or more angular intra prediction modes from the highest ranked angular intra prediction mode category in the remaining modes list.

Embodiments described herein may comprise, for example, 5 angular intra prediction mode categories, namely vertical mode (VER_IDX), horizontal mode (HOR_IDX), intra mode 2 (2), vertical diagonal mode (VDIA_IDX) and diagonal mode DIA_IDX, where an angular intra prediction mode of the most probable modes list falling within each angular intra prediction mode category, for example, corresponds to associating each of the angular intra prediction modes of the most probable modes list to the angular intra prediction mode category being closest to the corresponding angular intra prediction mode of the most probable modes list.

In an embodiment, the processing circuitry is further configured to complete the first portion of the remaining modes list, by repeating with the second highest ranked angular intra prediction mode category.

In an embodiment, each intra prediction mode is identified by an intra prediction mode index, and the processing circuitry is configured to define the plurality of angular intra prediction mode categories, on the basis of the respective angular intra prediction modes associated with a horizontal direction, a vertical direction and one or more diagonal directions.

In an embodiment, each intra prediction mode is identified by an intra prediction mode index, and the processing circuitry is configured to generate the first portion of the remaining modes list, by including one or more angular intra prediction modes in the first portion of the remaining modes list, whose respective intra prediction mode index has an offset of +1, −1, +2, −2, +3, −3, +4 or −4 with respect to an intra prediction mode index of an angular intra prediction mode of the most probable modes list.

In an embodiment, each list element of the most probable modes list is identified by a most probable modes index, and the processing circuitry is configured to generate the first portion of the remaining modes list, by including one or more angular intra prediction modes in the first portion of the remaining modes list, whose respective intra prediction mode index has an offset of +1, −1, +2, −2, +3, −3, +4 or −4 with respect to an intra prediction mode index of an angular intra prediction mode of the most probable modes list.

In an embodiment, the processing circuitry is configured to generate the first portion of the remaining modes list, by including one or more angular intra prediction modes in the first portion of the remaining modes list, on the basis of a processing loop starting with the offset of +1 with respect to an intra prediction mode index of an angular intra prediction mode of the most probable modes list, which is incremented during each round of the processing loop, or with the offset of −1 with respect to an intra prediction mode index of an angular intra prediction mode of the most probable modes list, which is decremented during each round of the processing loop.

In an embodiment, the processing circuitry is configured to repeat the processing loop for an angular intra prediction mode of the most probable modes list having a small most probable modes index, more often than the processing loop for an angular intra prediction mode of the most probable modes list having a large most probable modes index.

In an embodiment, the processing circuitry is configured to generate the first portion of the remaining modes list by including one or more angular intra prediction modes in the first portion of the remaining modes list, whose respective intra prediction mode index has an offset of +2, −2, +4, −4, +6, −6, +8 or −8 with respect to an intra prediction mode index of an angular intra prediction mode of the most probable modes list.

In an embodiment, the processing circuitry is further configured to generate the second portion of the remaining modes list, by including those intra prediction modes of the plurality of intra prediction modes in the second portion of the remaining modes list that are not part of the most probable modes list and the first portion of the remaining modes list.

In an embodiment, the processing circuitry is further configured to predict sample values of the current picture block using the adopted intra prediction mode and to provide a predicted picture block (105).

In an embodiment, the apparatus is an encoding apparatus, and where the processing circuitry is further configured to: encode the current picture block on the basis of the predicted picture block and the adopted intra prediction mode.

In an embodiment, the processing circuitry is further configured to signal a truncated binary code for an intra prediction mode of the current picture block, if the intra prediction mode belongs to the remaining modes list.

In an embodiment, the apparatus is a decoding apparatus, and where the processing circuitry is further configured to decode the current picture block on the basis of the predicted picture block and the adopted intra prediction mode.

In an embodiment, where the processing circuitry is further configured to parse a truncated binary code to determine an intra prediction mode of the current picture block, if the intra prediction mode belongs to the remaining modes list.

In an embodiment, a method for determining an adopted intra prediction mode on the basis of a most probable modes list and a remaining modes list having a first portion and a second portion is provided, where the adopted intra prediction mode is one of a plurality of intra prediction modes comprising a plurality of angular intra prediction modes for predicting sample values of a current picture block, where the method comprises: generating the first portion of the remaining modes list, by including one or more angular intra prediction modes determined on the basis of the most probable modes list, such that the one or more angular intra prediction modes of the first portion of the remaining modes list are close to a respective angular intra prediction mode of the most probable modes list; and determining the adopted intra prediction mode, in case the adopted intra prediction mode is part of the first portion of the remaining modes list, using less bits, e.g. for encoding or decoding the adopted intra prediction mode, than in case the adopted intra prediction mode is part of the second portion of the remaining modes list.

In an embodiment, a computer program product is provided, where the computer program product comprises program code for performing the above examples when executed on a computer or a processor.

In an embodiment, the processing circuitry is further configured to determine the first portion of the remaining modes list from a predetermined default mode list comprising or consisting of a planar mode (PLANAR_IDX), a dc mode (DC_IDX), a vertical mode (VER_IDX), an horizontal mode (HOR_IDX), an intra mode 2 (2), a vertical diagonal mode (VDIA_IDX), and a diagonal mode (DIA_IDX).

In an embodiment, the processing circuitry is further configured to determine the first portion of the remaining modes list by including the intra prediction modes of second tier neighbors of the current picture block.

In an embodiment, at both encoder and decoder, the intra mode is signaled by using truncated binarization for the non-MPM intra modes.

In an embodiment, since truncated binarization may be used for coding 61 non-MPM modes, the first three modes will require 5 bits to be signaled, and therefore the first three modes in non-MPM modes list is generated based on the intra modes which are already included in the MPM list.

In an embodiment, where the first three modes in the non-MPM modes list is signaled by a simple code word mapping, where mapping at the encoder is defined as a step which maps a intra mode code word which is known to consume less bits with a "different intra mode", which is known to consume more bits and at the same time more probable. At the decoder inverse mapping is defined as a step which maps an intra-mode which has been parsed from the bit-stream with a "different intra mode", which is then used as the actual intra prediction mode for the current picture block.

In an embodiment, a method of decoding video data is provided, where the method comprises: receiving encoded data of a picture block of a coding unit; decoding the encoded data to identify an intra prediction mode from a plurality of intra prediction modes for the picture block, the plurality of intra prediction modes comprise a set of MPMs, a first set of intra prediction modes and a second set of intra prediction modes, where one mode in the first set of intra prediction modes is encoded using N bits, one mode in the second set of intra prediction modes is encoded using M bits, N and M are positive integers, N is less than M, decoding the encoded data to identify an intra prediction mode from a plurality of intra prediction modes for the picture block comprising: decoding the encoded data to obtain an indication indicating whether the intra-prediction mode for the picture block is in the set of MPMs or not; if the indication indicating the intra prediction mode for the picture block is not in the set of MPMs, obtaining a intra prediction mode codeword for the picture block, the intra prediction mode codeword corresponding to an initial intra prediction mode; if the intra prediction mode codeword for the picture block is encoded using N bits, mapping the initial intra prediction mode to obtain a mapped intra prediction mode, using the mapped intra prediction mode as the identified intra prediction mode for the picture block; or, if the intra prediction mode codeword for the picture block is encoded using M bits, using the initial intra prediction mode as the identified intra prediction mode for the picture block.

In an embodiment, if the intra prediction mode codeword for the picture block is encoded using N bits, a value of the intra prediction mode codeword for the picture block is less than any one of a plurality of values corresponding to the second set of intra prediction modes.

In an embodiment, the mapping the initial intra prediction mode to obtain the mapped intra prediction mode, comprises: mapping the initial intra prediction mode according to the set of MPMs, to obtain the mapped intra prediction mode.

In an embodiment, the mapping the initial intra prediction mode according to the set of MPMs, comprises: ranking a plurality of intra prediction mode categories, according to the number and/or the direction of intra prediction modes in the set of MPMs falling within each intra prediction mode category; mapping the initial intra prediction mode according to the highest ranked intra prediction mode category.

In an embodiment, the mapping the initial intra prediction mode according to the set of MPMs, comprises: generating an initial set of intra prediction modes according to add an offset to a plurality of values corresponding to the set of MPMs; classifying the set of MPMs to obtain an highest ranked intra prediction mode category; mapping the initial intra prediction mode according to the highest ranked intra prediction mode category and the initial set of intra prediction modes.

In an embodiment, the initial set of intra prediction modes is generated according to add an offset of −1, +1, +2, −2, +3, −3, +4 or −4 to a plurality of values corresponding to the set of MPMs.

In an embodiment, the mapping the initial intra prediction mode to obtain the mapped intra prediction mode, comprises: mapping the initial intra prediction mode according to a predetermined default mode list comprising or consisting of a planar mode (PLANAR_IDX), a dc mode (DC_IDX), a vertical mode (VER_IDX), an horizontal mode (HOR_IDX), an intra mode 2 (2), a vertical diagonal mode (VDIA_IDX), and a diagonal mode (DIA_IDX), to obtain the mapped intra prediction mode.

In some embodiments, further aspects described herein are summarized in the following:

Embodiments of the present disclosure provide a method of decoding video data, where the method comprises: decoding encoded data of a picture block to obtain an intra prediction mode from a plurality of intra prediction modes for the picture block, the plurality of intra prediction modes for the picture block comprises a set of MPMs, and a set of non-MPM, where the set of non-MPM comprises a first set of intra prediction modes and a second set of intra prediction modes, where one mode in the first set of intra prediction modes is encoded using N bits, one mode in the second set of intra prediction modes is encoded using M bits, N and M are positive integers, N is less than M, where the decoding an encoded data of a picture block to obtain an intra prediction mode from a plurality of intra prediction modes for the picture block comprising: decoding the encoded data to obtain an indication indicating whether the intra-prediction mode for the picture block is in the set of MPMs or not; if the indication indicating the intra prediction mode for the picture block is not in the set of MPMs, generating a mapping relationship between at least one intra prediction mode in the first set of intra prediction modes and at least one intra prediction mode in the set of non-MPM; decoding the encoded data to obtain a intra prediction mode codeword for the picture block; obtaining the intra prediction mode for the picture block according to the mapping relationship and the intra prediction mode codeword.

In an embodiment, the mapping relationship is generated according to the set of MPMs.

In an embodiment, the mapping relationship is generated according to a predetermined default mode list comprising or consisting of a planar mode (PLANAR_IDX), a dc mode (DC_IDX), a vertical mode (VER_IDX), a horizontal mode (HOR_IDX), an intra mode 2 (2), a vertical diagonal mode (VDIA_IDX), and a diagonal mode (DIA_IDX).

In an embodiment, the generating a mapping relationship between at least one intra prediction mode in the first set of intra prediction modes and at least one intra prediction mode in the set of non-MPM, comprises: ranking a plurality of intra prediction mode categories according to the number and/or the direction of intra prediction modes in the set of MPMs falling within each intra prediction mode category; generating the mapping relationship according to the highest ranked intra prediction mode category.

In an embodiment, the generating a mapping relationship between a intra prediction mode in the first set of intra prediction modes and a intra prediction mode in the second a set of intra prediction modes, comprising: generating an initial set of intra prediction modes according to add an offset to a plurality of values corresponding to the set of MPMs; classifying the set of MPMs to obtain an highest ranked intra prediction mode category; generating the mapping relationship according to the highest ranked intra prediction mode category and the initial set of intra prediction modes.

In an embodiment, the initial set of intra prediction modes is generated according to add an offset of −1, +1, +2, −2, +3, −3, +4 or −4 to a plurality of values corresponding to the set of MPMs.

In an embodiment, the generating a mapping relationship between at least one intra prediction mode in the first set of intra prediction modes and at least one intra prediction mode in the set of non-MPM, comprises: generating a first set of values according to values of prediction modes in the set of MPMs, one value in the first values set is the smallest value of prediction mode in the set of non-MPM; generating a second set of values according to adding an offset to value of at least one prediction mode in the set of MPMs; generating the mapping relationship according to the first set of values and the second set of values.

In an embodiment, the generating a mapping relationship between at least one intra prediction mode in the first set of intra prediction modes and at least one intra prediction mode in the set of non-MPM, comprises: generating a first set of values according to values of prediction modes in the set of MPMs, one value in the first values set is the smallest value of prediction mode in the set of non-MPM; generating a second set of values according to adding an offset to value of at least one angular prediction mode in the set of MPMs; generating the mapping relationship according to the first set of values and the second set of values.

In an embodiment, a quantity of prediction modes in the plurality of intra prediction modes for the picture block is 67, a quantity of prediction modes in the set of MPMs is 6, a quantity of prediction modes in the first set of intra prediction modes in the set of non-MPMs is 3 and a quantity of prediction modes in the second set of intra prediction modes in the set of non-MPM is 58, where the generating a mapping relationship between at least one intra prediction mode in the first set of intra prediction modes and at least one intra prediction mode in the set of non-MPM, comprises: obtaining the smallest three values of three prediction modes in the set of non-MPM according to the values of prediction modes in the set of MPMs; obtaining two values of two angular prediction modes in the set of MPMs, adding offset to the two values to obtain offset values; obtaining a second set of values according to the values of prediction modes in the set of MPMs and the offset values; generating the mapping relationship according to the first set of values and the second set of values.

In an embodiment, the generating a mapping relationship between at least one intra prediction mode in the first set of intra prediction modes and at least one intra prediction mode in the set of non-MPM, comprises: generating a first set of values according to values of prediction modes in the set of MPMs, one value in the first values set is the smallest value of prediction mode in the set of non-MPM; generating a second set of values according to a predetermined default mode list comprising or consisting of a vertical mode (VER_IDX), an horizontal mode (HOR_IDX), an intra mode 2 (2), a vertical diagonal mode (VDIA_IDX), and a diagonal mode (DIA_IDX); generating the mapping relationship according to the first set of values and the second set of values.

In an embodiment, the generating a mapping relationship between at least one intra prediction mode in the first set of intra prediction modes and at least one intra prediction mode in the set of non-MPM, comprises: generating a first set of values according to values of prediction modes in the set of MPMs, one value in the first values set is the smallest value of prediction mode in the set of non-MPM; generating a second set of values according to a predetermined default mode list comprising or consisting of a planar mode (PLANAR_IDX), a dc mode (DC_IDX), a vertical mode (VER_IDX), an horizontal mode (HOR_IDX), an intra mode 2 (2), a vertical diagonal mode (VDIA_IDX), and a diagonal mode (DIA_IDX); generating the mapping relationship according to the first set of values and the second set of values.

In an embodiment, the intra prediction mode codeword is encoded using 5 bits, and the intra prediction mode codeword is one of 00000, 00001 or 00010.

In an embodiment, one of the at least one intra prediction mode in the first set of intra prediction modes correspondent to one of the at least one intra prediction mode in the set of non-WM.

Embodiments of the present disclosure further provide a decoder comprising processing circuitry configured for carrying out any one of the above methods.

Embodiments of the present disclosure further provide a computer program product comprising a program code for performing any one of the above methods.

Embodiments of the present disclosure further provide a decoder for decoding video data, where the decoder comprises: one or more processors; and a non-transitory computer-readable storage medium coupled to the processors and storing programming for execution by the processors, where the programming, when executed by the processors, configures the decoder to carry out any one of the above methods.

Embodiments of the present disclosure provide a method for constructing an MPM list, where the method comprises: determining whether a left block of a current coding unit (or coding block) is available or not, if the left block of the current coding unit is available, adding an intra prediction mode of the left block into an MPM list; determining whether an above block of the current coding unit is available or not, if the above block of the current coding unit is available, adding an intra prediction mode of the above block into the MPM list; if a planar mode is not in the MPM list, adding the planar mode into the MPM list; if a DC mode is not in the MPM list, adding the DC mode into the MPM list.

In an embodiment, when the prediction mode of the left block is not an intra prediction mode, the left block of the current coding unit is not available.

In an embodiment, when the current coding unit is a coding block located in the left-most side of a frame, the left block of the current coding unit is not available.

In an embodiment, parallel processing is supported and the current coding unit is a coding block located in the left-most side of a Tile, the left block of the current coding unit is not available.

In an embodiment, parallel processing is not supported and the current coding unit is a coding block located in the left-most side of a Tile but not in the left-most side of a frame, the left block of the current coding unit is available.

In an embodiment, parallel processing is supported and the current coding unit is a coding block located in the left-most side of a slice, the left block of the current coding unit is not available.

In an embodiment, parallel processing is not supported and the current coding unit is a coding block located in the left-most side of a slice but not in the left-most side of a frame, the left block of the current coding unit is available.

In an embodiment when the prediction mode of the above block is not an intra prediction mode, the above block of the current coding unit is not available.

In an embodiment, when the current coding unit is a coding block located in the top-most side of a frame, the above block of the current coding unit is not available.

In an embodiment, parallel processing is supported and the current coding unit is a coding block located in the top-most side of a Tile, the above block of the current coding unit is not available.

In an embodiment, parallel processing is not supported and the current coding unit is a coding block located in the top-most side of a Tile but not in the top-most side of a frame, the above block of the current coding unit is available.

In an embodiment, parallel processing is supported and the current coding unit is a coding block located in the top-most side of a slice, the above block of the current coding unit is not available.

In an embodiment, parallel processing is not supported and the current coding unit is a coding block located in the top-most side of a slice but not in the top-most side of a frame, the above block of the current coding unit is available.

In an embodiment when line buffer size is constrained and the current coding unit is a coding block located in the top-most side of a current CTU, the above block of the current coding unit is not available.

In an embodiment, the method further comprises: if the left block of the current coding unit is available and the intra prediction mode of the left block is an angular mode, adding an offset to the prediction mode of the left block to obtain a new prediction mode, if the new prediction mode is not in the MPM list, adding the new prediction mode into the MPM list.

In an embodiment, the offset is −1.

In an embodiment, the offset is 1.

In an embodiment, the method further comprises: if the above block of the current coding unit is available and the intra prediction mode of the above block is an angular mode, adding an offset to the prediction mode of the above block to obtain an above-offset prediction mode, if the above-offset prediction mode is not in the MPM list, adding the above-offset prediction mode into the MPM list.

In an embodiment, the offset is −1.

In an embodiment, the offset is 1.

In an embodiment, the method further comprises:

adding a vertical mode (VER_IDX), a horizontal mode (HOR_IDX), an intra mode 2 (2), a vertical diagonal mode (VDIA_IDX) or a diagonal mode (DIA_IDX) into the MPM list.

In an embodiment, the method further comprising a list of angular mode candidates comprising or consisting: a vertical mode (VER_IDX), a horizontal mode (HOR_IDX), an intra mode 2 (2), a vertical diagonal mode (VDIA_IDX) or a diagonal mode (DIA_IDX) into the MPM list; and the method further comprises: iteratively determining according to their order in the list, whether an angular mode of the list is in the MPM list, and if the respective angular mode is not in the MPM list adding the respective angular mode into the MPM list.

In an embodiment, the constructing of the MPM list starts with the step of determining whether a left block of a current coding unit is available or not, e.g. based on an empty MPM list.

In an embodiment, the method further comprises: if the left block of the current coding block is not available and another block in the general left direction is available (e.g. BL or AL in FIG. 5), inserting the intra prediction mode of the other block into the initial MPM list, if the left block is available, not inserting the intra prediction mode of the other block into the initial MPM list.

In an embodiment, the method further comprises: if the above block of the current coding block is not available and another block in the general above direction is available (e.g. AR or AL in FIG. 5), inserting the intra prediction mode of the other block into the initial MPM list, if the above block is available, not inserting the intra prediction mode of the other block into the initial MPM list.

In an embodiment, the method further comprises: adding a vertical mode (VER_IDX), a horizontal mode (HOR_IDX), an intra mode 2 (2), a vertical diagonal mode (VDIA_IDX) or a diagonal mode (DIA_IDX) into the initial MPM list if they are not already in the initial MPM list.

In an embodiment, the method further comprises: if both the left and the above block of the current coding block are not angular, then further check one more other neighboring blocks (e.g. BL or AL or AR in FIG. 5). If any of them (BL, or AL, or AR) is angular, then use this angular mode as the starting angular mode for the −1+1 derivation process, as previously described.

Embodiments of the present disclosure further provide an encoder comprising processing circuitry for carrying out any one of the above methods.

Embodiments of the present disclosure further provide a decoder comprising processing circuitry for carrying out any one of the above methods.

Embodiments of the present disclosure further provide a computer program product comprising a program code for performing any one of above methods.

The present disclosure further provides a decoder to construct an MPM list, where the decoder comprises: one or more processors; and a non-transitory computer-readable storage medium coupled to the processors and storing programming for execution by the processors, where the programming, when executed by the processors, configures the decoder to carry out any one of the above methods.

Embodiments of the present disclosure further provide an encoder to construct an MPM list, comprising: one or more processors; and a non-transitory computer-readable storage medium coupled to the processors and storing programming for execution by the processors, where the programming, when executed by the processors, configures the encoder to carry out any one of the above methods.

Embodiments of the present disclosure may be implemented in digital electronic circuitry, or in computer software, firmware, or hardware, including the structures disclosed in this disclosure and their structural equivalents, or in combinations of one or more of them. Implementations of the subject matter described in this disclosure may be implemented as one or more computer programs, i.e., one or more modules of computer program instructions, encoded on computer storage medium for execution by, or to control the operation of, data processing apparatus. Alternatively or in addition, the program instructions may be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate physical and/or non-transitory components or media (for example, multiple CDs, disks, or other storage devices).

In some embodiments, the operations (or methods) described herein may be implemented as a hosted service provided on a server in a cloud computing network. For example, the computer-readable storage media may be logically grouped and accessible within a cloud computing network. Servers within the cloud computing network may include a cloud computing platform for providing cloud-based services. The terms "cloud," "cloud computing," and "cloud-based" may be used interchangeably as appropriate without departing from the scope of this disclosure. Cloud-based services may be hosted services that are provided by servers and delivered across a network to a client platform to enhance, supplement, or replace applications executed locally on a client computer. The circuit may use cloud-based services to quickly receive software upgrades, applications, and other resources that would otherwise require a lengthy period of time before the resources may be delivered to the circuit.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program may be deployed to be executed on one computer or on multiple computers that are located at one site or distributed across multiple sites and interconnected by a communication network.

The processes and logic flows described in this disclosure may be performed by one or more programmable processors executing one or more computer programs to perform actions by operating on input data and generating output. The processes and logic flows may also be performed by, and apparatus may also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer may be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory may be supplemented by, or incorporated in, special purpose logic circuitry.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While several embodiments have been provided in the present disclosure, it should be understood that the disclosed systems and methods might be embodied in many other specific forms. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

What is claimed is:

1. A method for constructing a most probable mode (MPM) list for luma intra prediction process corresponding to a video block, the method comprising:
   determining whether a left block of a current coding block is available;
   in response to determining that the left block of the current coding block is available, adding an intra prediction mode of the left block into an MPM list;
   determining whether an above block of the current coding block is available;
   in response to determining that the above block of the current coding block is available, adding an intra prediction mode of the above block into the MPM list;
   adding an offset to the intra prediction mode of the left block to obtain a new prediction mode when the left block of the current coding block is available and the intra prediction mode of the left block is an angular mode; and adding the new prediction mode into the MPM list;
   or
   adding an offset to the intra prediction mode of the above block to obtain an above-offset prediction mode when the above block of the current coding block is available and the intra prediction mode of the above block is an angular mode; and adding the above-offset prediction mode into the MPM list.

2. The method of claim 1, wherein the offset is −1 or +1.

3. The method of claim 1, further comprising
   adding a planar mode into the MPM list; and
   adding a DC mode into the MPM list.

4. The method of claim 1, wherein when the current coding block is a coding block located in a left-most side of a frame, the left block of the current coding block is determined as not available.

5. The method of claim 1, wherein when a prediction mode of the above block is not an intra prediction mode, the above block of the current coding block is determined as not available.

6. The method of claim 1, wherein when the current coding block is a coding block located in a top-most side of a frame, the above block of the current coding block is determined as not available.

7. The method of claim 1, wherein
   the intra prediction mode of the left block is an angular mode,
   the intra prediction mode of the above block is an angular mode, and
   the intra prediction mode of the above block is different with the intra prediction mode of the left block.

8. A decoder, comprising:
   one or more processors; and
   a memory coupled to the one or more processors to store instructions, which when executed by the one or more processors, cause the one or more processors to perform operations, the operations including:
   determining whether a left block of a current coding block is available;
   in response to determining that the left block of the current coding block is available, adding an intra prediction mode of the left block into a most probable mode (MPM) list;
   determining whether an above block of the current coding block is available;
   in response to determining that the above block of the current coding block is available, adding an intra prediction mode of the above block into the MPM list;
   adding an offset to the intra prediction mode of the left block to obtain a new prediction mode when the left block of the current coding block is available and the intra prediction mode of the left block is an angular mode; and adding the new prediction mode into the MPM list;
   or
   adding an offset to the intra prediction mode of the above block to obtain an above-offset prediction mode when the above block of the current coding block is available and the intra prediction mode of the above block is an angular mode; and adding the above-offset prediction mode into the MPM list.

9. The decoder of claim 8, wherein
   the intra prediction mode of the left block is an angular mode,
   the intra prediction mode of the above block is an angular mode, and
   the intra prediction mode of the above block is different with the intra prediction mode of the left block.

10. The decoder of claim 8, wherein the offset is −1 or +1.

11. The decoder of claim 8, the operations further comprising:
    adding a planar mode into the MPM list; and
    adding a DC mode into the MPM list.

12. The decoder of claim 8, wherein when the current coding block is a coding block located in a left-most side of a frame, the left block of the current coding block is determined as not available.

13. The decoder of claim 8, wherein when a prediction mode of the above block is not an intra prediction mode, the above block of the current coding block is determined as not available.

14. The decoder of claim 8, wherein when the current coding block is a coding block located in a top-most side of a frame, the above block of the current coding block is determined as not available.

15. A non-transitory machine-readable medium having instructions stored therein, which when executed by a processor, cause the processor to perform operations, the operations comprising:
    determining whether a left block of a current coding block is available;
    in response to determining that the left block of the current coding block is available, adding an intra prediction mode of the left block into a most probable mode (MPM) list;
    determining whether an above block of the current coding block is available;

in response to determining that the above block of the current coding block is available, adding an intra prediction mode of the above block into the MPM list;

adding an offset to the intra prediction mode of the left block to obtain a new prediction mode when the left block of the current coding block is available and the intra prediction mode of the left block is an angular mode; and adding the new prediction mode into the MPM list;

or adding an offset to the intra prediction mode of the above block to obtain an above-offset prediction mode when the above block of the current coding block is available and the intra prediction mode of the above block is an angular mode; and adding the above-offset prediction mode into the MPM list.

16. The non-transitory machine-readable medium of claim 15, wherein the offset is −1 or +1.

17. The non-transitory machine-readable medium of claim 15, wherein the operations further comprise:

adding a planar mode into the MPM list; and adding a DC mode into the MPM list.

18. The non-transitory machine-readable medium of claim 15, wherein when the current coding block is a coding block located in a left-most side of a frame, the left block of the current coding block is determined as not available.

19. The non-transitory machine-readable medium of claim 15, wherein when a prediction mode of the above block is not an intra prediction mode, the above block of the current coding block is determined as not available.

20. The non-transitory machine-readable medium of claim 15, wherein the intra prediction mode of the left block is an angular mode, the intra prediction mode of the above block is an angular mode, and the intra prediction mode of the above block is different with the intra prediction mode of the left block.

* * * * *